(12) United States Patent
Kim et al.

(10) Patent No.: US 11,525,060 B2
(45) Date of Patent: Dec. 13, 2022

(54) NEAR-INFRARED ABSORBING COMPOSITION, OPTICAL STRUCTURE COMPRISING THE SAME, AND CAMERA MODULE AND ELECTRONIC DEVICE COMPRISING THE SAME

(71) Applicant: Samsung Electronics Co., Ltd., Suwon-si (KR)

(72) Inventors: Changki Kim, Suwon-si (KR); Hyung Jun Kim, Suwon-si (KR); Jong Hoon Won, Yongin-si (KR); Yong Joo Lee, Suwon-si (KR); Jae Jun Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 528 days.

(21) Appl. No.: 16/729,717

(22) Filed: Dec. 30, 2019

(65) Prior Publication Data

US 2020/0332132 A1 Oct. 22, 2020

(30) Foreign Application Priority Data

Apr. 16, 2019 (KR) .................. 10-2019-0044304

(51) Int. Cl.
| | | |
|---|---|---|
| *C09D 4/00* | (2006.01) | |
| *C09D 5/32* | (2006.01) | |
| *G02B 5/20* | (2006.01) | |
| *H04N 5/225* | (2006.01) | |
| *C08K 5/56* | (2006.01) | |

(52) U.S. Cl.
CPC ............... *C09D 5/32* (2013.01); *C09D 4/00* (2013.01); *G02B 5/208* (2013.01); *H04N 5/2254* (2013.01); *C08K 5/56* (2013.01)

(58) Field of Classification Search
CPC ... C09D 4/00; C09D 5/32; C08K 5/56; G02B 5/208; H04N 5/2254
See application file for complete search history.

(56) References Cited

U.S. PATENT DOCUMENTS

| | | |
|---|---|---|
| 9,465,142 B2 | 10/2016 | Muro et al. |
| 9,575,213 B2 | 2/2017 | Nagaya et al. |
| 9,606,275 B2 | 3/2017 | Nagaya et al. |
| 9,618,666 B2 | 4/2017 | Kawashima et al. |
| 9,746,595 B2 | 8/2017 | Nagaya et al. |
| 9,791,596 B2 | 10/2017 | Nagaya et al. |

(Continued)

FOREIGN PATENT DOCUMENTS

| | | |
|---|---|---|
| JP | H11-052127 A | 2/1999 |
| JP | 2000007871 A | 1/2000 |

(Continued)

*Primary Examiner* — Bijan Ahvazi
(74) *Attorney, Agent, or Firm* — Harness, Dickey & Pierce, P.L.C.

(57) ABSTRACT

Disclosed are a near-infrared absorbing composition, an optical structure, and a camera module and an electronic device including the same. The near-infrared absorbing composition includes a copper salt capable of absorbing light in a near-infrared wavelength region and an amine compound, wherein the amine compound includes a first amine compound having no polymerizable functional group and a second amine compound including at least monofunctional polymerizable functional group.

24 Claims, 22 Drawing Sheets

(56) References Cited

U.S. PATENT DOCUMENTS

| | | |
|---|---|---|
| 9,791,606 B2 | 10/2017 | Nagaya et al. |
| 9,991,304 B2 | 6/2018 | Kimura et al. |
| 10,215,898 B2 | 2/2019 | Sasaki et al. |
| 2015/0138369 A1 | 5/2015 | Takakuwa et al. |
| 2016/0103247 A1* | 4/2016 | Hitomi .................. G03B 11/00 438/69 |
| 2018/0003872 A1 | 1/2018 | Kubo et al. |
| 2018/0149783 A1 | 5/2018 | Won et al. |
| 2018/0188428 A1 | 7/2018 | Arimura et al. |

FOREIGN PATENT DOCUMENTS

| | | |
|---|---|---|
| JP | 2004277868 A | 10/2004 |
| JP | 2004-311883 A | 11/2004 |
| JP | 2011100084 A | 5/2011 |
| JP | 5169032 B2 | 3/2013 |
| JP | 2014-044431 A | 3/2014 |
| JP | 5540477 B2 | 7/2014 |
| JP | 5611631 B2 | 10/2014 |
| JP | 2015-172102 A | 10/2015 |
| JP | 5884953 B2 | 3/2016 |
| JP | 2016061883 A | 4/2016 |
| JP | 6230479 B2 | 11/2017 |
| JP | 6281395 B2 | 2/2018 |
| JP | 2018-084647 A | 5/2018 |
| JP | 6329638 B2 | 5/2018 |
| KR | 2014-0088559 A | 7/2014 |
| KR | 2015-0023375 A | 3/2015 |
| KR | 20160091970 A | 8/2016 |
| KR | 20160094389 A | 8/2016 |
| KR | 101658414 B1 | 9/2016 |
| KR | 101809497 B1 | 12/2017 |
| KR | 101853263 B1 | 4/2018 |
| KR | 10-2018-0062380 A | 6/2018 |
| WO | WO-2016068037 A1 | 5/2016 |
| WO | WO-2017006571 A1 | 1/2017 |
| WO | WO-17056803 A1 | 4/2017 |

\* cited by examiner

NEAR-INFRARED ABSORBING COMPOSITION, OPTICAL STRUCTURE COMPRISING THE SAME, AND CAMERA MODULE AND ELECTRONIC DEVICE COMPRISING THE SAME

CROSS-REFERENCE TO RELATED APPLICATION

This application claims priority to and the benefit of Korean Patent Application No. 10-2019-0044304, filed in the Korean Intellectual Property Office on Apr. 16, 2019, the entire contents of which are incorporated herein by reference.

BACKGROUND

1. Field

A near-infrared absorbing composition, an optical structure, and a camera module and an electronic device including the same are disclosed.

2. Description of the Related Art

Recently, electronic devices including image sensors that store images as electrical signals, such as cell phones, digital cameras, camcorders, and cameras, have been widely used.

These electronic devices may include an optical filter having a near-infrared absorptivity in order to reduce or prevent generation of optical distortions by light in the ranges other than the visible range.

The optical filter is generally mounted in front of an image sensor of a camera module and thus plays a role in effectively absorbing near-infrared light and resolving the optical distortion phenomenon.

Recently, many attempts to make the optical filter into a thin film have been made according to a requirement of down-sizing and higher integration with electronic devices. However, when the thin-film optical filter is used to observe and take a picture of a high luminance subject, it may cause a flare phenomenon such as a Wi-Fi-type flare phenomenon that an outline is generated around the subject, a petal flare phenomenon that light is irradiated with the subject as the center, and the like.

This flare phenomenon is an optical distortion phenomenon generated when an image sensor in an electronic device recognizes light in a visible wavelength range and infrared to near-infrared wavelength range.

Accordingly, in order to reduce or minimize the optical distortion phenomenon, light in the near-infrared wavelength region not recognized by human eyes needs to be absorbed or reflected and thus blocked from reaching the sensor.

SUMMARY

A near-infrared absorbing composition having good near-infrared absorbance and reliability with respect to a high temperature/high humidity environment and low visible light absorbance is provided.

In addition, an optical structure formed using the near-infrared absorbing composition and a camera module and an electronic device including the same are provided.

According to an embodiment, a near-infrared absorbing composition includes a copper salt capable of absorbing light in a near-infrared wavelength region; a first amine compound having no polymerizable functional group and a second amine compound including at least a monofunctional polymerizable functional group.

The first and second amine compounds may each independently include a secondary amine compound, a tertiary amine compound, or a combination thereof.

The first and second amine compounds may each independently include an aliphatic secondary amine compound, an aliphatic tertiary amine compound, or a combination thereof.

The polymerizable functional group may include an alkenyl group, an alkynyl group, a acrylate group, an epoxy group, or a combination thereof.

A combination of the first amine compound and the second amine compound may be included in an amount greater than 0 wt % and less than or equal to 20 wt % based on a solid content of the near-infrared absorbing composition.

The first amine compound and second amine compound may have a boiling point of greater than or equal to 90° C.

The first amine compound may be represented by Chemical Formula 1.

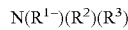  [Chemical Formula 1]

Wherein, $R^1$, $R^2$, and $R^3$ are independently a C1 to C20 alkyl group, a C4 to C20 cycloalkyl group, $-(CH_2)_j-R^a$ (wherein, $R^a$ is a C1 to C10 heteroalkyl group, a C4 to C20 cycloalkyl group, or a C4 to C20 heterocycloalkyl group and j is an integer of 1 to 10), or a combination thereof.

$R^1$, $R^2$, and $R^3$ may independently a C1 to C20 linear alkyl group, a C3 to C20 branched alkyl group, or a C4 to C20 cycloalkyl group, and when one or more of $R^1$, $R^2$, and $R^3$ is a C1 to C2 alkyl group, at least one of the remaining groups may be a C3 to C20 linear alkyl group, a C3 to C20 branched alkyl group, or a C4 to C20 cycloalkyl group.

The first amine compound may include compounds represented by Chemical Formula 1-1 to Chemical Formula 1-4, or a combination thereof.

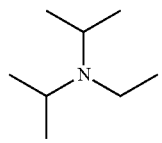  [Chemical Formula 1-1]

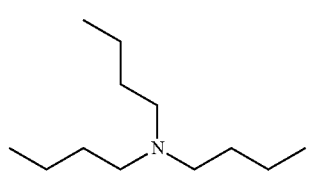  [Chemical Formula 1-2]

[Chemical Formula 1-3]

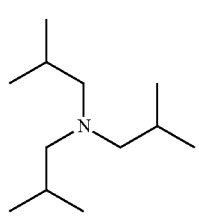

[Chemical Formula 1-4]

(structure: dicyclohexylamine — two cyclohexyl groups attached to NH)

The second amine compound may be represented by Chemical Formula 2.

[Chemical Formula 2]

(structure showing acrylate ester with amine group)

Wherein $R_{11}$ and $R_{12}$ are independently a C1 to C20 alkyl group, a C2 to C20 alkenyl group, a C2 to C20 alkynyl group, or a C4 to C20 cycloalkyl group, $R_{13}$ is hydrogen, a C1 to C20 alkyl group, a C2 to C20 alkenyl group, a C2 to C20 alkynyl group, or a C4 to C20 cycloalkyl group, and k is an integer of 0 to 8.

The copper salt may be represented by Chemical Formula 3.

$$Cu(L^1)_m(L^2)_n$$ [Chemical Formula 3]

Wherein, $L^1$ and $L^2$ are independently a ligand of a substituted or unsubstituted C2 to C20 alkylester group, a substituted or unsubstituted phosphate group, a substituted or unsubstituted phosphonate group, a substituted or unsubstituted sulfate group, or a substituted or unsubstituted sulfonate group, $0 < m \leq 2$, and $0 < n \leq 2$.

The first and second amine compounds may independently form a coordination with the copper salt.

The first and second amine compounds and the copper salt may form a copper complex represented by Chemical Formula 4.

[Chemical Formula 4]

(structure showing copper complex with ligands)

Wherein,

Q is phosphorous or sulfur; t1 is an integer of 0 to 8, $R^{21}$ and $R^{22}$ are each independently hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, $-OR^{b1}$, $-C(=O)R^{b2}$, $-OC(=O)R^{b3}$ (wherein $R^{b1}$, $R^{b2}$, and $R^{b3}$ are each independently hydrogen, a substituted or unsubstituted C1 to C20 alkyl group, a substituted or unsubstituted C1 to C20 alkenyl group, a substituted or unsubstituted C1 to C20 aryl group, or a substituted or unsubstituted C3 to C20 heteroaryl group), or a functional group represented with Chemical Formula X.

[Chemical Formula X]

(structure showing acrylate group)

Wherein, $R^{b4}$ is hydrogen, a substituted or unsubstituted C1 to C20 alkyl group, a substituted or unsubstituted C2 to C20 heteroalkyl group, a substituted or unsubstituted C6 to C20 aryl group, or a substituted or unsubstituted C13 to C20 heteroaryl group, and t2 is an integer of 0 to 8.

The near-infrared absorbing composition may further include a polymerizable cross-linking monomer including an acryl-based cross-linking monomer, an epoxy-based cross-linking monomer, or a combination thereof.

The near-infrared absorbing composition may have a maximum absorption wavelength in a wavelength region of about 820 nm to about 900 nm.

According to another embodiment, an optical structure includes a near-infrared absorption layer formed using the aforementioned near-infrared absorbing composition.

The copper salt may be included in an amount of 50 wt % to 70 wt % based on a total weight of the near-infrared absorption layer.

The optical structure may further include a transparent substrate in contact with the near-infrared absorption layer.

The optical structure after being placed at a temperature of 80° C. under relative humidity of 85 RH % for 24 hours may exhibit a change of an average light transmittance of less than or equal to about −5% in a wavelength region of about 430 nm to about 565 nm.

The optical structure after being placed at a temperature of 80° C. under relative humidity of 85 RH % for 24 hours may exhibit a change of an average light transmittance of less than or equal to about 10%.

The optical structure after being placed at a temperature of 80° C. under relative humidity of 85 RH % for 24 hours may exhibit a change of an average light transmittance of less than or equal to about 8% in a wavelength region of about 950 nm to about 1100 nm.

According to another embodiment, a camera module includes a lens; an image sensor; and the aforementioned optical structure disposed between the lens and the image sensor, and/or an electronic device including the aforementioned optical structure.

The near-infrared absorbing composition may exhibit improved near-infrared absorbance and reliability with respect to a high temperature/high humidity environment and low visible light absorbance.

In addition, the optical structure formed using the near-infrared absorbing composition may exhibit improved near-infrared absorbance and reliability with respect to a high temperature/high humidity environment and low visible light absorbance as described above.

In addition, a camera module and an electronic device including the optical structure may be provided.

BRIEF DESCRIPTION OF THE DRAWINGS

FIG. 14 (Example 2), FIG. 15 (Example 3), FIG. 16 (Example 4), FIG. 17 (Example 5), FIG. 18 (Comparative Example 1), FIG. 19 (Comparative Example 2), FIG. 20 (Comparative Example 3), FIG. 21 (Comparative Example 4), and FIG. 22 (Comparative Example 5).

DETAILED DESCRIPTION

Figure 1:
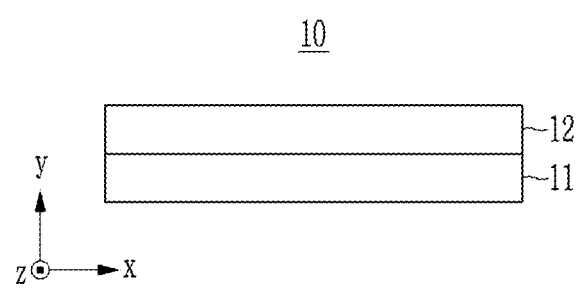
FIG. 1 is a schematic cross-sectional view showing an optical structure according to an embodiment.

Hereinafter, example embodiments will be described in detail so that a person skilled in the art would understand the same. This disclosure may, however, be embodied in many different forms and is not construed as limited to the example embodiments set forth herein.

In the drawings, the thickness of layers, films, panels, regions, etc., are not to scale, and exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

For a particle diameter of a particle in an embodiment, although it may be numerized by a measurement to show an average size of a group, the generally used method includes a mode diameter showing the maximum value of the distribution, a median diameter corresponding to the center value of integral distribution curve, a variety of average diameters (numeral average, length average, area average, mass average, volume average, etc.), and the like. Unless particularly mentioning otherwise, an average particle diameter means to a numeral average diameter in the present disclosure, and it is obtained by measuring D50 (particle diameter at a position of distribution rate of 50%).

In an embodiment, when specific definition is not otherwise provided, a thickness of each constituent element may refer to "an average thickness."

The "average thickness" of each constituent element is calculated by extracting from 5 to 10 random points a scanning electron microscopic (SEM) cross-sectional image of each constituent element, measuring thicknesses, and calculating an arithmetic average of the measured thicknesses.

In an embodiment, when specific definition is not otherwise provided, the average light transmittance is an average value of light transmittances measured during incident light irradiation in the vertical direction (front side direction) of the measurement object.

As used herein, when specific definition is not otherwise provided, "substituted" refers to replacement of at least one hydrogen atom by a substituent of a halogen atom (F, Cl, Br, or I), a C1 to C20 alkoxy group, a hydroxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when a definition is not otherwise provided, the term 'hetero' refers to one including 1 to 3 heteroatoms selected from N, O, S, and P.

In an embodiment, an amine compound is defined as a primary amine ($RNH_2$) compound, a secondary amine ($R_2NH$) compound, and a tertiary amine ($R_3N$) compound, respectively, depending on a degree of hydrogen replacement in ammonia by a hydrocarbon group (R).

In an embodiment, in a (meth) acrylate group, "meth" in parentheses refers to that it may be omitted. That is, in an embodiment, (meth)acrylate group refers to acrylate or methacrylate and poly(meth)acrylate refers to polyacrylate or polymethacrylate.

In general, near-infrared absorbing materials may be classified into organic materials and inorganic materials. Examples of the organic materials may include organic dyes such as immonium and diimmonium, and the inorganic materials may include a soluble metal salt such as a copper phosphate salt. The soluble metal salt generally has a structure in which one or more of the same type of ligand is bound to a central metal (e.g., copper).

The organic material has improved near-infrared absorbance, but as described above, the aforementioned near-infrared absorption wavelength has a narrow line width. Accordingly, the organic material alone may hardly absorb light in a broad near-infrared wavelength region ranging from about 700 nm to about 1200 nm, and accordingly, various types of organic materials may need to be stacked. Herein, since light transmittance of a near-infrared absorption layer using the organic material in a visible light range may be deteriorated, there is a limit in increasing the stack number of the near-infrared absorption layer.

The inorganic material has lower near-infrared absorbance than the organic material and thus may be formed into a little thicker near-infrared absorption layer than that of the organic material in order to secure absorbance (e.g., about 50 µm to about 200 µm). The inorganic material has improved light transmittance regarding a visible region, and accordingly, even though the thickness is increased, a light loss due to visible light absorption may be small.

In addition, the soluble metal salt used as the inorganic material, for example, a copper phosphate salt and the like is more heat resistant but weaker to moisture than the organic material and accordingly, may exhibit greatly deteriorated optical properties under a high temperature/high humidity environment. The moisture weakness of the copper salt occurs, according as adjacent water molecules are coordinated with copper, a central metal element. When the water molecules are coordinated with the copper of the copper salt, light transmittance of a visible wavelength region and/or absorbance of a near-infrared wavelength region may deteriorate.

Hereinafter, a near-infrared absorbing composition according to an embodiment is described.

A near-infrared absorbing composition according to an embodiment may include a copper salt and different types of amine compounds.

The copper salt may absorb light in a near-infrared wavelength region, and thus a near-infrared absorbing composition according to an embodiment may exhibit absorptivity for a near-infrared ray belonging to a wavelength region of for example about 700 nm to about 1200 nm.

In an embodiment, the copper salt may include a copper complex in which various ligands are coordinated with copper as a central metal element.

The ligands are not particularly limited, but for example, a ligand derived from an inorganic acid or an inorganic acid ester, a ligand derived from an organic acid or an organic acid ester, or a combination thereof.

The ligands may be varied in order to show an improved absorbance in a near-infrared wavelength region of interest and/or an improved organic solvent solubility for an organic solvent.

Examples of the ligands may include ligands derived from inorganic acid compounds, inorganic acid ester compounds, and the like, ligands derived from organic acid compounds, organic acid ester compounds, and the like, or a combination thereof.

Specifically, the copper salt may be represented by Chemical Formula 3.

$$Cu(L^1)_m(L^2)_n \qquad \text{[Chemical Formula 3]}$$

Wherein, $L^1$ and $L^2$ are each independently a ligand of a substituted or unsubstituted C2 to C20 alkylester group, a substituted or unsubstituted phosphate group, a substituted or unsubstituted phosphonate group, a substituted or unsubstituted sulfate group, or a substituted or unsubstituted sulfonate group, $0 < m \le 2$, and

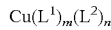.

In an embodiment, $L^1$ and $L^2$ may be the same type of ligands or a different type of ligands. When $L^1$ and $L^2$ are different types of ligands, for example when $L^1$ is a ligand derived from an inorganic acid such as a phosphate, a phosphonate, a sulfate, a sulfonate, and the like, $L^2$ may be a ligand derived from an organic acid such as acetic acid, and the like. In this case, it is advantageous to regulate/secure absorptivity to the target near-infrared wavelength region through $L^1$, and it may be advantageous to secure solubility for an organic solvent by using $L^2$.

In other words, when the copper salt according to an embodiment has different types of ligands, coating properties may be ensured by keeping the solubility for an organic solvent even if the molecular weights of the ligands are decreased, while it is easy to adjust a target near-infrared wavelength region within a predetermined range.

The copper may form a coordination bond having a coordination number of greater than or equal to 2, for example greater than or equal to 3; less than or equal to 5; or less than or equal to 4, for example 1 to 4, or 2 to 4 with respect to a sum of $L^1$ and $L^2$.

When $L^1$ and $L^2$ are coordinated with copper within the aforementioned ranges, it is possible to obtain an appropriate near-infrared absorptivity while ensuring an appropriate level of solubility of the copper salt for an organic solvent, and different types of amine compounds which will be described later may be adjusted to be respectively coordinated with copper.

In an embodiment, the amine compound may be further coordinated with the aforementioned copper salt. This is due to a strong coordination force between nitrogen atoms and copper in an amine group. In other words, the amine compound may prevent and/or minimize further coordination of water molecules with the copper salt by removing coordination sites in the copper salt through coordination with the copper salt.

The water molecules may approach the copper salt through various routs from preparation of the near-infrared absorbing composition to formation of a near-infrared absorption layer, an optical structure, and the like, which are formed by using the same. When the water molecules are coordinated with the copper salt, light transmittance in a visible wavelength region and/or absorbance in a near-infrared wavelength region may be greatly deteriorated, as described above, and particularly, the near-infrared absorbance of the copper salt may be greatly deteriorated.

However, according to an embodiment, moisture absorption resistance of the copper salt may be improved by using the amine compound from the preparation of the near-infrared absorbing composition for forming a near-infrared absorption layer.

Accordingly, when the near-infrared absorbing composition according to an embodiment is used to form a near-infrared absorption layer, initial absorbance in a near-infrared wavelength region of the near-infrared absorption layer and absorbance in a near-infrared wavelength region after having gone through a high temperature/high humidity environment are all good.

In an embodiment, a boiling point of the amine compound may be, for example greater than or equal to about 90° C., greater than or equal to about 95° C., greater than or equal to about 100° C., greater than or equal to about 105° C., greater than or equal to about 110° C., greater than or equal to about 115° C., or greater than or equal to about 120° C. When the boiling point of the amine compound satisfies the above ranges, the amine compound may be maintained without being volatilized during a drying process of a subsequent manufacturing process of an optical structure (e.g., film, coating film, etc.), and resultantly a near-infrared absorption layer having improved optical properties and moisture absorption resistance may be formed.

In an embodiment, the amine compound includes a first amine compound and a second amine compound as different types of amine compounds. The first amine compound and the second amine compound may each independently coordinate with the aforementioned copper salt.

In an embodiment, the first amine compound and the second amine compound are different types of amine compounds distinguished from each other, and may be specifically distinguished by existence of a polymeric functional group in the compound.

In an embodiment, the first amine compound does not include a polymeric functional group, and the second amine compound includes at least a monofunctional polymerizable functional group. In this way, when the different types of amine compounds are included with reference to existence of a polymerizable functional group, excellent optical properties and high temperature/high humidity reliability may be secured compared with a case of including any one type of an amine compound alone.

The polymerizable functional group is not particularly limited, and may include for example an alkenyl group, an alkenyl group, a acrylate group, an epoxy group, or a combination thereof. Specifically, the polymerizable functional group is an acrylate group, an epoxy group, or a combination thereof.

For example, the polymerizable functional group may include a (meth)acrylate group. When the second amine compound includes a (meth)acrylate group, the near-infrared absorbing composition according to an embodiment may not only exhibit improved visible light transmittance due to the (meth)acrylate group but also play a role of a sort of a binder of fixing positions of the copper salt and the first and second amine compounds through cross-linking of the (meth)acrylate group and a polymerizable cross-linking monomer which will be described later during the preparation of the near-infrared absorption layer and thus minimize generation of a near-infrared absorptivity deviation depending on a position of the near-infrared absorption layer.

In an embodiment, the amine compound may include a secondary amine compound, a tertiary amine compound, or a combination thereof. That is, each of the first amine compound and the second amine compound may be a secondary amine compound, a tertiary amine compound, or a combination thereof.

In an embodiment, the first amine compound may include a secondary amine compound, a tertiary amine compound, or a combination thereof and the second amine compound may include a tertiary amine compound. In an embodiment, each of the first amine compound and the second amine compound may include a tertiary amine compound.

In an embodiment, even though the aforementioned amine compound is coordinated with the copper salt, an inherent near-infrared absorption wavelength of the copper salt may be changed within the near-infrared wavelength region. For example, the secondary amine compound is coordinated with the copper salt and thus may shift the inherent near-infrared absorption wavelength of the copper salt towards a short wavelength direction, but a maximum absorption wavelength (Amax) of the copper salt may be altered by the shift but still belong to the near-infrared wavelength region (e.g., about 700 nm to about 1200 nm). On the other hand, even though the tertiary amine compound is coordinated with the copper salt, the inherent near-infrared absorption wavelength of the copper salt may not be changed, or if changed, the change may be minimized.

Accordingly, the secondary and tertiary amine compounds as the first and second amine compounds may be appropriately combined to easily realize a near-infrared absorbing composition having a target near-infrared absorption wavelength.

In an embodiment, the amine compound may not include the primary amine compound. The primary amine compound is coordinated with the copper salt and thus may cause gelation of a copper salt-amine compound. However, the amine compound according to an embodiment includes the secondary amine compound, the tertiary amine compound, or a combination thereof, and accordingly, even though coordinated with the copper salt, the gelation of the copper salt-amine compound may not be generated or may be minimized. Accordingly, even though the amine compound according to an embodiment is further coordinated with the copper salt, coating properties, thin film formability, and optical properties of a near-infrared absorption layer formed by using the same may be excellently maintained.

On the other hand, the amine compound may not include an aromatic functional group. That is, each of the amine compounds, specifically first and second amine compounds, may be an aliphatic amine compound. Since the aromatic functional group has absorptivity for the visible wavelength region, it is desirable to use the aliphatic amine compound as the amine compound considering light transmittance of the visible wavelength region.

For example, the first amine compound may be an aliphatic amine compound that does not include a polymerizable functional group, and the second amine compound may be an aliphatic amine compound that includes a polymerizable functional group.

Specifically, the aforementioned first amine compound may be represented by Chemical Formula 1.

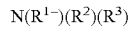  [Chemical Formula 1]

Wherein, $R^1$, $R^2$, and $R^3$ may each independently be a C1 to C20 alkyl group, a C4 to C20 cycloalkyl group, or —$(CH_2)_j$—$R^a$ (wherein, $R^a$ is a C1 to C10 heteroalkyl group, a C4 to C20 cycloalkyl group, or a C4 to C20 heterocycloalkyl group and j is an integer of 1 to 10).

$R^1$, $R^2$, and $R^3$ may each independently be a C1 to C20 linear alkyl group, a C3 to C20 branched alkyl group, or a C4 to C20 cycloalkyl group, and when one or more of $R^1$, $R^2$, and $R^3$ is a C1 to C2 alkyl group, at least one of the remaining groups may be a C3 to C20 linear alkyl group, a C3 to C20 branched alkyl group, or a C4 to C20 cycloalkyl group. Thus, by controlling a relationship of functional groups of the first amine compound, a boiling point of the first amine compound may be easily controlled to fall within the above ranges.

In an embodiment, the first amine compound may include compounds represented by Chemical Formula 1-1 to Chemical Formula 1-4, or a combination thereof.

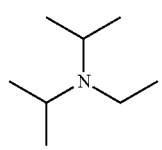  [Chemical Formula 1-1]

-continued

[Chemical Formula 1-2]

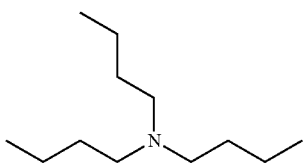

[Chemical Formula 1-3]

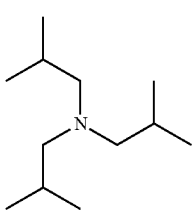

[Chemical Formula 1-4]

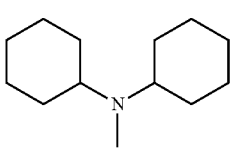

As described above, the first amine compound may compensate near-infrared absorptivity of the copper salt, but when the first amine compound is used alone, solubility of the copper salt-first amine compound for an organic solvent may be deteriorated, and thereby, formability of a near-infrared absorption layer may be deteriorated, a near-infrared absorptivity deviation depending on a position of the near-infrared absorption layer may be generated, and as haze of the formed near-infrared absorption layer is greatly increased, appropriate visible light transmittance required of an optical structure may not be obtained.

Accordingly, in an embodiment, the second amine compound along with the first amine compound is coordinated with the copper salt to minimize the aforementioned visible light transmittance deterioration, a near-infrared absorptivity deviation, and the like due to the first amine compound.

Specifically, the second amine compound may be represented by Chemical Formula 2.

[Chemical Formula 2]

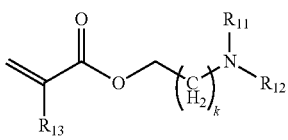

Wherein, $R_{11}$ and $R_{12}$ are each independently a C1 to C20 alkyl group, a C1 to C20 alkenyl group, a C1 to C20 alkynyl group, or a C4 to C20 cycloalkyl group, $R_{13}$ is hydrogen, a C1 to C20 alkyl group, a C1 to C20 alkenyl group, a C1 to C20 alkynyl group, or a C4 to C20 cycloalkyl group, and k is an integer of 0 to 8.

The aforementioned second amine compound improves a visible light transmittance of the near-infrared absorbing composition through the polymerizable functional group and may minimize a deviation of the near-infrared absorption layer formed using the same. However, when the second amine compound is coordinated with the copper salt, a coordination blocking effect between the copper salt and the water molecules may be lower than that of the aforementioned first amine compound. Accordingly, when a near-infrared absorption layer is formed by including the second amine compound alone without the first amine compound, reliability with respect to a high temperature/high humidity environment and particularly, reliability with respect to near-infrared absorptivity may be greatly deteriorated.

Accordingly, an embodiment uses different types of first and second amine compounds along with the aforementioned copper salt and thus may maintain excellent reliability with respect to a high temperature/high humidity environment as well as secure good visible light transmittance and good near-infrared absorptivity.

In a near-infrared absorbing composition according to an embodiment, the first and second amine compounds may respectively be coordinated with a copper salt to constitute a copper complex as shown in Chemical Formula 4.

[Chemical Formula 4]

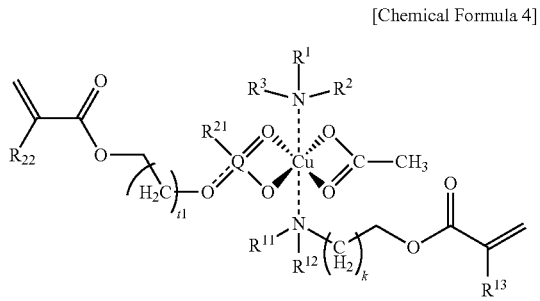

Wherein, $R^1$, $R^2$, and $R^3$ are each independently the same as in the aforementioned Chemical Formula 1, $R^{11}$, $R^{12}$, $R^{13}$, and k are each independently the same as in the aforementioned Chemical Formula 2, Q is either phosphorous or sulfur;

t1 is an integer of 0 to 8, and $R^{21}$ and $R^{22}$ are each independently hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, $-OR^{b1}$, $-C(=O)R^{b2}$, $-OC(=O)R^{b3}$ (wherein $R^{b1}$, $R^{b2}$, and $R^{b3}$ are each independently hydrogen, a substituted or unsubstituted C1 to C20 alkyl group, a substituted or unsubstituted C2 to C20 alkenyl group, a substituted or unsubstituted C6 to C20 aryl group, or a substituted or unsubstituted C3 to C20 heteroaryl group), or a functional group represented by Chemical Formula X.

[Chemical Formula X]

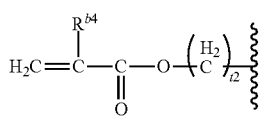

Wherein, $R^{b4}$ is hydrogen, a substituted or unsubstituted C1 to C20 alkyl group, a substituted or unsubstituted C1 to C20 heteroalkyl group, a substituted or unsubstituted C6 to C20 aryl group, or a substituted or unsubstituted C3 to C20 heteroaryl group, and t2 is an integer of 0 to 8.

In the near-infrared absorbing composition, in order to have an appropriate level of near-infrared absorption layer formability while the first amine compound, second amine compound, and copper salt may form the aforementioned copper complex according to Chemical Formula 4, the amine compound may be included in an amount of greater than 0 wt %, for example less than or equal to about 20 wt %, based on a solid content weight of the near-infrared absorbing composition.

When the amine compound is not included in the near-infrared absorbing composition, moisture absorption resistance and reliability with respect to a high temperature/high humidity environment may not be secured, but when included in an amount of greater than about 20 wt %, the copper complex represented by Chemical Formula 4 may be gelated and thus greatly deteriorate formability of the near-infrared absorption layer.

In addition, in the near-infrared absorbing composition, the first and second amine compounds and the copper salt may form the copper complex represented by Chemical Formula 4 by using the first and second amine compounds that constitute the amine compound, for example, in a weight ratio of about 1:1 to about 1:2, about 1:1 to about 1:1.9, about 1:1 to about 1:1.8, about 1:1 to about 1:1.7, about 1:1 to about 1:1.6, about 1:1 to about 1:1.5, about 1:1 to about 1:1.4, about 1:1 to about 1:1.3, or about 1:1 to about 1:1.2.

When the first and second amine compounds are used within the aforementioned weight ratio ranges, as described above, good visible light transmittance and near-infrared absorptivity may not only be maintained, but also reliability with respect to a high temperature/high humidity environment may be secured.

The near-infrared absorbing composition according to an embodiment may further include a solvent. In an embodiment, the solvent may be an organic solvent. Examples of the organic solvent may be tetrahydrofuran, ethanol, butanol, acetone, methylethylketone, 1-methoxy-2-propanol, cyclopentanone, propylene glycol monomethylether, or a combination thereof. In other words, the copper salt and the copper complex represented by Chemical Formula 4 according to an embodiment may exhibit improved solubility in the organic solvent.

On the other hand, the near-infrared absorbing composition according to an embodiment may further include a polymerizable cross-linking monomer. In an embodiment, the polymerizable cross-linking monomer may be thermal polymerizable or photo-polymerizable. In an embodiment, the polymerizable cross-linking monomer may be an acryl-based monomer, an epoxy-based monomer, or a combination thereof. The polymerizable cross-linking monomer may function as a binder during formation of a near-infrared absorption layer by using the near-infrared absorbing composition.

In an embodiment, the polymerizable cross-linking monomer may include an acryl-based cross-linking monomer and an acryl-based cross-linking monomer and a content of the acryl-based cross-linking monomer may be greater than a content of the acryl-based cross-linking monomer based on a total weight of the polymerizable cross-linking monomer. A weight ratio of the acryl-based cross-linking monomer and the acryl-based cross-linking monomer may be 1:1 to about 20:1, for example about 1:1 to about 15:1, about 1:1 to about 10:1, about 1:1 to about 9:1, about 1:1 to about 8:1, about 1:1 to about 7:1, about 1:1 to about 6:1, or about 1:1 to about 5:1.

The acryl-based cross-linking monomer may form a hydroxyl group during polymerization and the hydroxyl group may form a chemical bond (e.g., hydrogen bond) with copper within the copper salt. Since the hydroxyl group has high reactivity with moisture, high temperature/high humidity reliability of the near-infrared absorbing composition may be deteriorated if the hydroxyl group is increased. However, in an embodiment, when the polymerizable cross-linking monomer is adjusted so that the content of the acryl-based cross-linking monomer is greater than the content of the epoxy-based cross-linking monomer the optical properties and the high temperature/high humidity reliability of the near-infrared absorbing composition may be improved.

In an embodiment, the polymerizable cross-linking monomer has photo-polymerization property, and accordingly, the near-infrared absorbing composition may further include an additive for initiating a photo-polymerization reaction among the cross-linking monomers, for example, a photoinitiator and the like. However, an embodiment is not necessarily limited thereto, but the polymerizable cross-linking monomer may have thermal polymerization property, and accordingly, a different type of a polymer binder from the polymerizable cross-linking monomer, a surfactant, and an antioxidizing agent may be further included as an additive.

In an embodiment, the polymerizable cross-linking monomer is not particularly limited as long as it forms a cross-linking during a curing process of the near-infrared absorbing composition to serve as a binder. However, it may be included in an amount of greater than or equal to about 5 wt %, and for example less than or equal to about 50 wt % based on the solid content of the near-infrared absorbing composition.

On the other hand, the near-infrared absorbing composition according to an embodiment may further include an organic dye having near-infrared absorptivity in addition to the aforementioned copper salt. Examples of the organic dye may include a polymethine compound, a phthalocyanine compound, a merocyanine compound, a naphthalocyanine compound, an immonium compound, a diimmonium compound, a triarylmethane compound, a dipyrromethene compound, an anthraquinone compound, a naphthoquinone compound, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof.

The organic dye has a narrower line width of a near-infrared absorption wavelength is narrower than that of the aforementioned copper salt and thus may be used together with the aforementioned copper salt, when absorptivity regarding light in a particularly narrow wavelength region among near-infrared rays needs to be complemented. In other words, the near-infrared absorbing composition according to an embodiment may include the aforementioned copper salt and at least one type of an organic dye having absorptivity in a particular near-infrared wavelength region which needs to be complemented.

However, an embodiment is not necessarily limited thereto, but for example, the near-infrared absorbing composition according to an embodiment does not further include a separate organic dye, but when the near-infrared absorbing composition according to an embodiment is formed into a near-infrared absorption layer (including the copper salt), a separate near-infrared absorption layer (including the organic dye) differing from the near-infrared absorption layer (including the copper salt) may be further formed.

The near-infrared absorbing composition according to an embodiment may be adjusted to have a maximum absorption wavelength, even though changed depending on a specific target near-infrared wavelength, in a wavelength region of for example, about 820 nm to about 900 nm, about 820 nm to about 890 nm, about 820 nm to about 880 nm, about 820 nm to about 870 nm, about 820 nm to about 860 nm, or about 820 nm to about 850 nm.

As described above, the near-infrared absorbing composition according to an embodiment uses the different types of amine compounds along with the copper salt and thus includes the copper complex that the different types of amine compounds are coordinated with the copper salt, through which coordination of water molecules with the copper is blocked, and accordingly, may secure improved optical properties and reliability with respect to a high temperature/ high humidity environment.

Accordingly, the near-infrared absorbing composition according to an embodiment may be easily formed into a near-infrared absorption layer having a thickness of about 50 μm to about 200 μm, and in addition, the formed near-infrared absorption layer may have good optical properties and reliability with respect to a high temperature/high humidity environment due to the aforementioned near-infrared absorbing composition.

Hereinafter, an optical structure according to an embodiment that is an optical structure including a near-infrared absorption layer manufactured using the aforementioned composition will be described with reference to drawing.

FIG. 1 is a schematic cross-sectional view showing an optical structure according to an embodiment.

Referring to FIG. 1, an optical structure 10 includes a near-infrared absorption layer 12. In an embodiment, an example of an optical structure 10 is illustrated in which a near-infrared absorption layer 12 is formed on a transparent substrate 11, but the optical structure 10 according to an embodiment is not necessarily limited.

For example, an optical structure according to an embodiment may not be formed on a transparent substrate, but may be formed directly on an image sensor, or may be a film covered with a releasing paper or the like.

On the other hand, the first near-infrared absorption layer may be formed as a monolayer or a multilayer. In the case of the multiple layer, it may include an interlayer interfacial adhesive and an overcoating layer that minimizes or prevents oxygen and moisture permeation. The first near-infrared absorption layer, and another layer performing near-infrared absorption and/or reflection may provide a multilayer.

In an embodiment, the transparent substrate 11 may be made of an optically transparent substrate and may have, for example, an average light transmittance of greater than or equal to about 80%, greater than or equal to about 85%, or greater than or equal to about 90% in a visible region. Herein, the visible region may be for example a wavelength region of greater than about 380 nm and less than about 700 nm and the average light transmittance is an average value of light transmittance measured when incident light is irradiated in a vertical direction (front direction) of the transparent substrate 11.

The transparent substrate 11 may be made of glass or a polymer material. In an embodiment, it is advantageous to realize a thin film of the transparent substrate 11 and the optical structure 10 when the transparent substrate 11 is composed of a polymer material.

The polymer material may include, for example polyethyleneterephthalate, polyethylenenaphthalate, triacetyl cellulose, polycarbonate, a cycloolefin polymer, poly(meth)acrylate, polyimide, polystyrene, or a combination thereof, but is not limited thereto.

The transparent substrate 11 may selectively absorb at least one a portion of light in an ultraviolet (UV) region. Ultraviolet (UV) absorptivity of the transparent substrate 11 may be caused by a material itself of the transparent substrate 11, but the transparent substrate 11 having ultraviolet (UV) absorptivity may be formed by adding an ultraviolet (UV) absorber thereto. Herein, the ultraviolet (UV) region may be, for example, a wavelength region of less than or equal to about 380 nm.

The transparent substrate 11 may absorb most of light in a wavelength region of at least about 350 nm to about 380 nm, and thus an average light transmittance of the optical structure 10 in a wavelength region of about 350 nm to about 380 nm may be less than or equal to about 1%, less than or equal to about 0.8%, or less than or equal to about 0.5%.

The transparent substrate 11 may include various additives according to desirable properties of the optical structure 10 as needed.

The transparent substrate 11 may have a thickness of about 10 μm to about 120 μm, specifically about 10 μm to about 100 μm, about 10 μm to about 80 μm, about 60 μm to about 40 μm, or about 10 μm to about 20 μm.

The transparent substrate 11 may be formed as a multilayer of at least two layers if needed, or the transparent substrate may be omitted.

The near-infrared absorption layer 12 is configured to transmit light in a visible region and to selectively absorb at least a portion of light in a near-infrared region. Herein, the visible region may be for example a wavelength region of greater than 380 nm and less than 700 nm and the near-infrared region may be a wavelength region of about 700 nm to about 1200 nm.

The near-infrared absorption layer 12 includes the aforementioned copper salt; the aforementioned first amine compound; the second amine compound; and a cross-linking polymerization product formed through a thermal or photo cross-linking polymerization of a thermal polymerizable or photo polymerizable polymer and further includes others such as a surfactant, an antioxidizing agent, a photoinitiator, and the like.

However, when the copper salt has a polymerizable functional group, the near-infrared absorption layer 12 may include the aforementioned first amine compound; copper salt, second amine compound, and cross-linking polymerization product formed through thermal or photo cross-linking polymerization of the thermal or photo polymerizable polymer; and the others such as a surfactant, an antioxidizing agent, a photoinitiator, and the like.

In an embodiment, the aforementioned copper salt in the near-infrared absorption layer 12 may be respectively included in an appropriate amount, so that the near-infrared absorption layer 12 may have target near-infrared absorptivity. In an embodiment, the copper salt may be in a range of about 50 wt % to about 70 wt % based on a total weight of the near-infrared absorption layer 12.

The near-infrared absorption layer 12 may be obtained by coating the aforementioned near-infrared absorbing composition on the transparent substrate 11 and polymerizing the amine compound and/or polymerizable cross-linking monomers by using a photo and/or thermal polymerization reaction.

Examples of methods for coating the near-infrared absorbing composition on the transparent substrate 11 include a spin coating, a slit coating, a bar coating, a blade coating, a slot die coating, and/or an inkjet coating.

The near-infrared absorption layer 12 in the optical structure 10 may have, for example a thickness of about 10 μm to about 200 μm, about 50 μm to about 200 μm, or about 50 μm to about 150 μm. Within the thickness ranges, the optical structure 10 may realize performance of an optical filter.

However, an embodiment is not necessarily limited thereto, but the thickness of the near-infrared absorption layer 12 may be variously set by considering a relationship with the copper salt and/or types and contents of the first and second amine compounds, types and contents of the polymerizable cross-linking monomers, and the other constituent elements constituting the optical structure, for example, a transparent substrate, a separate near-infrared absorption layer and/or infrared reflection layer including an organic dye, and the like.

The optical structure 10 according to an embodiment transmits light in a visible region effectively and blocks light in a near-infrared region effectively, even if the transparent substrate 11 and the near-infrared absorption layer 12 are sequentially stacked.

In addition, light in an ultraviolet (UV) region may be effectively blocked by imparting an absorption function of light in an ultraviolet (UV) region to the transparent substrate 11. Accordingly, the optical structure 10 may effectively sense light in a visible region in a sensor sensing light such as an image sensor by increasing purity of transmittance of light in a visible region of light in all wavelength regions and thus optical distortion by light besides the visible region may be decreased or prevented.

For example, the optical structure 10 including the near-infrared absorption layer 12 may have an average light transmittance of, for example, greater than or equal to about 75% in a wavelength region of about 435 nm to about 565 nm, an average light transmittance of, for example, less than or equal to about 40% in a wavelength region of about 950 nm to about 1100 nm, and an average light transmittance of for example less than or equal to about 55% in a wavelength region of about 1100 nm to 1200 nm. The average light transmittance is an average value of light transmittance measured when incident light is irradiated in a vertical direction (front direction) of the optical structure 10.

The optical structure after being placed at a temperature of 80° C. under relative humidity of 85 RH % for 24 hours may exhibit a change of an average light transmittance of greater than or equal to about −5% in a wavelength region of about 430 nm to about 565 nm.

The optical structure after being placed at a temperature of 80° C. under relative humidity of 85 RH % for 24 hours may exhibit a change of an average light transmittance of less than or equal to about 10% in a wavelength region of about 950 nm to about 1200 nm.

The optical structure after being placed at a temperature of 80° C. under relative humidity of 85 RH % for 24 hours may exhibit a change of an average light transmittance of less than or equal to about 8%, less than or equal to about 7%, less than or equal to about 6%, less than or equal to about 5%, less than or equal to about 4%, less than or equal to about 3%, less than or equal to about 2.9%, or less than or equal to about 2.8% in a wavelength region of about 950 nm to about 1100 nm.

Herein, the aforementioned temperature, humidity, and placing time conditions are a stringent environment of high temperature/high humidity, and the change of the average light transmittance is a difference in the average light transmittance of the optical structure 10 after the condition application, as compared with the (initial) average light transmittance of the optical structure 10 before the condition application.

In addition, when the change of the average light transmittance in the wavelength region of about 430 nm to about 565 nm is negative, it is favorable as it near to zero (0), while when it is positive, it is favorable as it is larger. When the change of the average light transmittance in a near-infrared wavelength region (about 700 nm to about 1200 nm) is negative, it is favorable as it is smaller while when it is positive, it is favorable as it is near to zero (0).

In this way, the optical structure 10 may selectively absorb and thus block light in a near-infrared wavelength region corresponding to a boundary between a visible region and an infrared region out of all the wavelength region and thus reduces or prevents crossing and mixing of a signal by light in a visible region with a signal by light in a non-visible region and resultantly, may reduce or prevent an optical distortion such as a crosstalk.

In addition, the optical structure 10 may effectively absorb light in a near-infrared region regardless of an incident direction and accordingly, effectively absorb and block incident light in a near-infrared region from a side direction and thus reduce or prevent the incident light in a near-infrared region from a side direction from distorting the signal by light in a visible region.

In addition, the optical structure 10 not only has good initial optical properties due to the aforementioned near-infrared absorbing composition, but also has good reliability for high temperature/high humidity environments.

Figure 2:
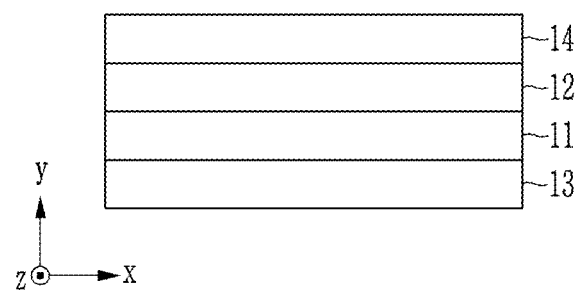
FIG. 2 is a schematic cross-sectional view showing an optical structure according to an exemplary variation.

FIG. 2 is a schematic cross-sectional view showing an optical structure according to an exemplary variation.

Referring to FIG. 2, the optical structure 10 according to exemplary variation includes a transparent substrate 11, a near-infrared absorption layer 12, and infrared reflection layer 13 and 14.

The transparent substrate 11 and the near-infrared absorption layer 12 are the same as described above.

The infrared reflection layers 13 and 14 may be disposed on at least one of one surface of the transparent substrate and one surface of the near-infrared absorption layer. For example, the infrared reflection layers 13 and 14 may be disposed under the transparent substrate 11 and/or on the near-infrared absorption layer 12. In the drawing, the infrared reflection layers 13 and 14 are shown, but either of them may be omitted.

The infrared reflection layers 13 and 14 effectively reflect light in an infrared wavelength region and thus may effectively reduce or prevent optical distortion by the light in an infrared wavelength region.

The infrared reflection layers 13 and 14 may reflect light in a portion of a near-infrared region, a mid-infrared region, and a far-infrared region, for example a wavelength region of about 700 nm to about 3 μm.

The infrared reflection layers 13 and 14 are not particularly limited as long as they reflect light in an infrared wavelength region and may be, for example a high refractive-index reflective layer, a reflective layer including a high refractive-index nanoparticle, or a multilayer including a plurality of layers having different refractive indexes, but is not limited thereto.

For example, the infrared reflection layers 13 and 14 may include a first layer and a second layer consisting materials having different refractive indexes, and may include a multilayer where the first layer and the second layer are alternately and repeatedly stacked.

The first layer and the second layer may be, for example a dielectric layer including an oxide layer, a nitride layer, an oxynitride layer, a sulfide layer, or a combination thereof, and for example the first layer may have a refractive index of less than about 1.7 and the second layer may have a refractive index of greater than or equal to about 1.7. Within the ranges, for example the first layer may have a refractive index of greater than or equal to about 1.1 and less than about 1.7 and the second layer may have a refractive index about 1.7 to about 2.7, or for example the first layer may have a refractive index of about 1.2 to about 1.6 and the second layer may have a refractive index of about 1.8 to about 2.5.

The first layer and the second layer may include any material having the refractive indexes within the ranges, and for example the first layer may include a silicon oxide, an aluminum oxide, or a combination thereof and the second layer may include titanium oxide, zinc oxide, indium oxide, zirconium oxide, or a combination thereof. The first layer and the second layer may be, for example five-layered to 80-layered, for example 5-layered to 50-layered.

Thicknesses of the first layer and the second layer may be determined according to a refractive index and a reflection wavelength of each layer, for example each of the first layer may have a thickness of about 10 nm to about 700 nm and each of the second layer may have a thickness of about 30 nm to about 600 nm. Thicknesses of the first layer and the second layer may be the same or different.

The optical structure 10 may have, for example a thickness of about 10 μm to about 200 μm. Within the ranges of the thickness, an infrared absorption optical filter may be realized.

The optical structure 10 according to the present embodiment includes the transparent substrate 11 and the first near-infrared absorption layer 12 like the aforementioned embodiment and transmits light in a visible region effectively and blocks light in a near-infrared region effectively. In addition, the optical structure 10 according to the present embodiment further includes infrared reflection layers 13 and 14, thereby effectively blocks light in a mid-infrared region and a far-infrared region by reflecting them, and thus may be effectively used as an optical filter preventing transmittance of light in all the infrared regions. Accordingly, the optical structure 10 may be applied to an electronic device and thus may reduce or prevent distortion of an optical signal in a visible region by light in the infrared region.

The aforementioned optical structure 10 may be applied to all uses for filtering light in an infrared or near-infrared wavelength region, and may be, for example applied to a camera module and an electronic device including the same. The electronic device may be a digital camera, a camcorder, a monitoring camera such as CCTV, an in-car camera, a medical camera, a cell phone having a built-in or external camera, a computer having a built-in or external camera, a laptop computer having a built-in or external camera, and the like but is not limited thereto.

Figure 3:
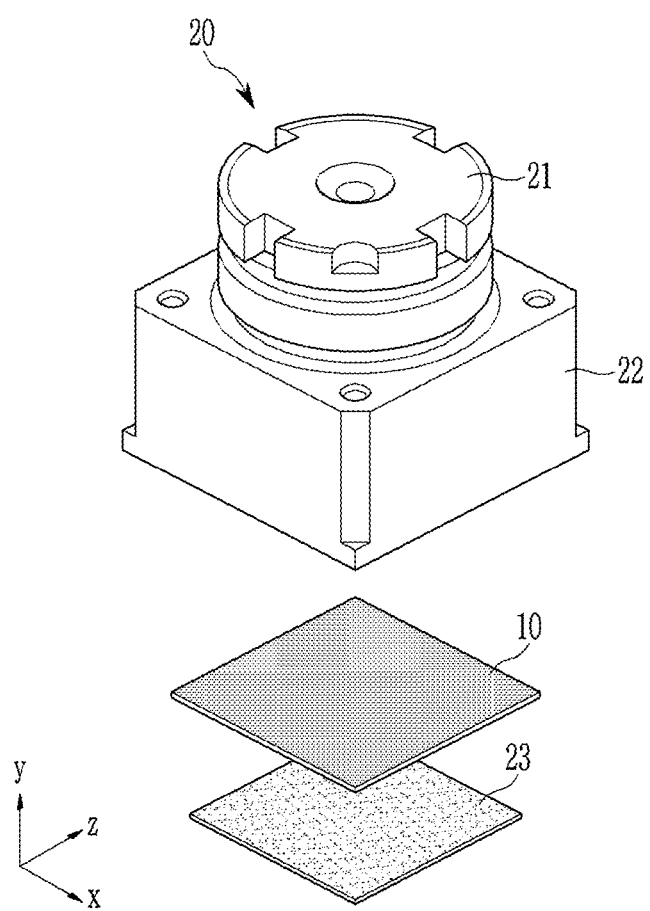
FIG. 3 is a schematic view showing a camera module according to an embodiment.

FIG. 3 is a schematic view showing a camera module according to an embodiment.

Referring to FIG. 3, a camera module 20 includes a lens barrel 21, a housing 22, an optical structure 10, and an image sensor 23.

The lens barrel 21 includes at least one lens imaging a subject, and the lens may be disposed along an optical axis direction. Herein, the optical axis direction may be a vertical direction of the lens barrel 21.

The lens barrel 21 is internally housed in the housing 22 and united with the housing 22. The lens barrel 21 may be moved in optical axis direction inside the housing 22 for autofocusing.

The housing 22 supports and houses the lens barrel 21 and may be open in the optical axis direction. Accordingly, incident light from one surface of the housing 22 may reach the image sensor 23 through the lens barrel 21 and the optical structure 10.

The housing 22 may be equipped with an actuator for moving the lens barrel 21 in the optical axis direction. The actuator may include a voice coil motor (VCM) including a magnet and a coil. However, various methods such as a mechanical driving system or a piezoelectric driving system using a piezoelectric device other than the actuator may be adopted.

The optical structure 10 is the same as described above.

The image sensor 23 may concentrate an image of a subject and thus store it as data, and the stored data may be displayed as an image through a display media.

The image sensor 23 may be mounted in a substrate (not shown) and electrically connected to the substrate. The substrate may be, for example, a printed circuit board (PCB) or electrically connected to a printed circuit board, and the printed circuit may be, for example, a flexible printed circuit (FPCB).

The image sensor 23 concentrates light passing the lens barrel 21 and the optical structure 10 and generates a video signal and may be a complementary metal-oxide semiconductor (CMOS) image sensor and/or a charge coupled device (CCD) image sensor.

Figure 4:
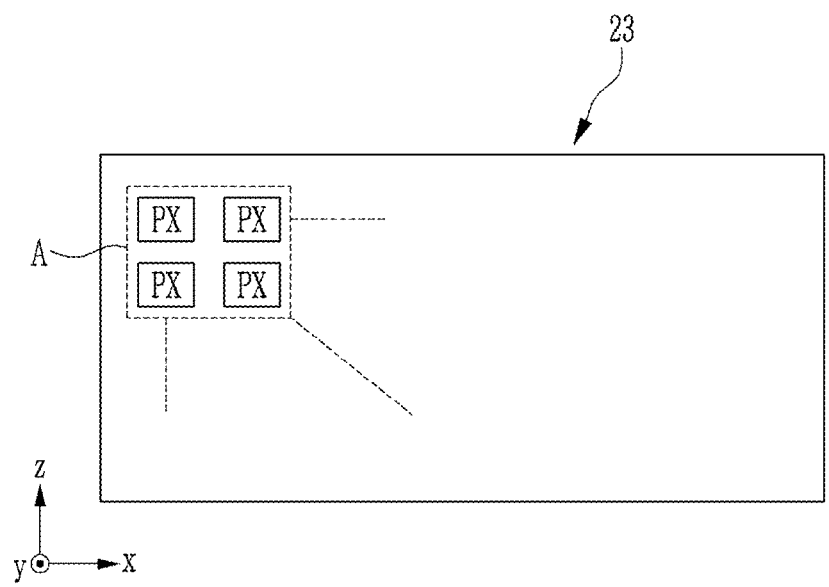
FIG. 4 is a schematic view showing an example of a pixel array of a sensor according to some example embodiments.

FIG. 4 is a schematic view showing an example of a pixel array of a sensor according to some example embodiments Referring to FIG. 1, a sensor 23 according to some example embodiments includes a plurality of pixels (PX) and the plurality of pixels (PX) may have a matrix array repeatedly arranged along rows and columns. The plurality of pixels (PX) may form ("at least partially comprise") a unit pixel group (A) of for example a 2×2 array of pixels, for example as shown in FIG. 4. However, an arrangement of the pixels are not limited thereto but variously modified, and the unit pixel group (A) may be variously modified into different arrays of pixels, including a 3×3 array, a 4×4 array, or the like, besides the 2×2 array.

At least a part of the pixels may include a plurality of sensors having different functions inside one pixel, and the plurality of sensors may be stacked therein. In some example embodiments, each pixel (PX) may include two or more sensors that are configured to sense (e.g., absorb) light in different wavelength regions ("wavelength spectra of light") in relation to each other, and the sensors configured to sense the light in different wavelength regions each other may be stacked in a direction that is perpendicular (e.g., perpendicular within manufacturing tolerances and/or material tolerances) to a top surface 110S of a substrate of the sensor 23, as shown in at least FIG. 6 (e.g., a Y direction). Herein, the light of the different wavelength regions may be respectively selected from a visible wavelength region; an infra-red wavelength region including a near infra-red wavelength region; and an ultraviolet (UV) wavelength region.

Figure 5:
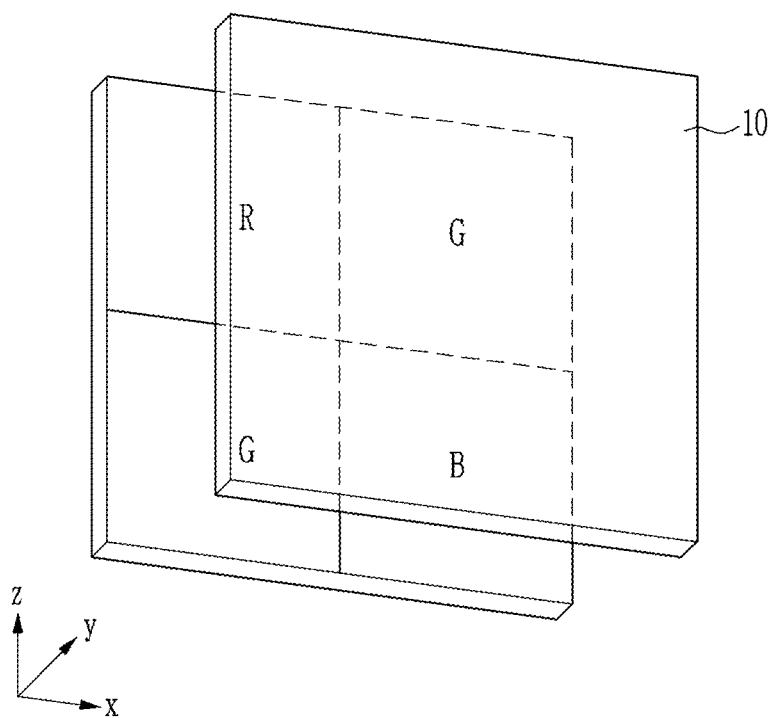
FIG. 5 is a top plan view showing an arrangement relationship between the image sensor and the optical structure.

FIG. 5 is a top plan view showing an arrangement relationship between the image sensor and the optical structure, and FIG. 5 is a cross-sectional view showing another example of an image sensor.

Referring to FIG. 5, the image sensor includes a red photoelectric device, a green photoelectric device, and a blue photoelectric device aligned to have a layer pattern as a single layer and an optical structure 10 disposed thereon. In an embodiment, at least one of the red photoelectric device, the green photoelectric device, and the blue photoelectric device may be an organic photoelectric device.

However, an embodiment is not necessarily limited thereto, but a specific material (one of an organic material, an inorganic material, an organic/inorganic hybrid material, and the like) forming the photoelectric devices or the alignment and/or stacking of the photoelectric devices (a structure of disposing at least one of the blue, red, and green photoelectric devices as a separate layer from the other photoelectric devices and the like) may be variously modified and/or designed.

Figure 6:
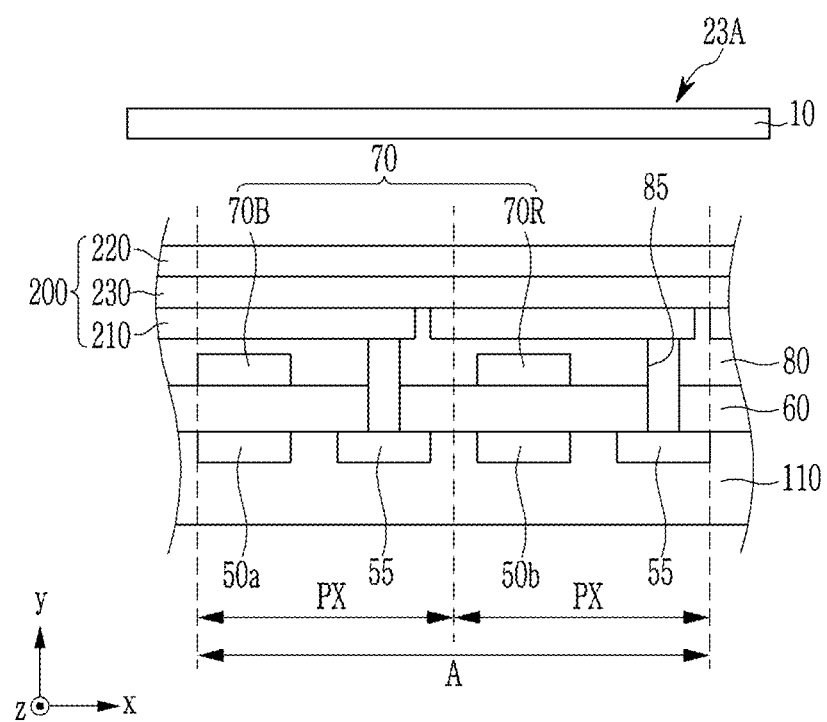
FIG. 6 is a cross-sectional view showing another example of an image sensor.

Referring to FIG. 6, an image sensor according to an embodiment may be an organic CMOS image sensor 23A. The organic CMOS image sensor 23A includes a semiconductor substrate 110 integrated with photo-sensing devices 50a and 50b, a transmission transistor (not shown), and a charge storage 55, a lower insulation layer 60, a color filter layer 70, an upper insulation layer 80, and an organic photoelectric device 200.

The semiconductor substrate 110 may be a silicon substrate, and is integrated with the photo-sensing devices 50a and 50b, the transmission transistor (not shown), and the charge storage 55. The photo-sensing devices 50a and 50b may be photodiodes.

The photo-sensing devices 50a and 50b sense light, the information sensed by the photo-sensing devices may be transferred by the transmission transistor, the charge storage 55 is electrically connected to the organic photoelectric device 100, and the information of the charge storage 55 may be transferred by the transmission transistor.

The photo-sensing devices 50a and 50b sense light, the information sensed by the photo-sensing devices may be transferred by the transmission transistor, the charge storage 55 is electrically connected to the organic photoelectric device 200, and the information of the charge storage 55 may be transferred by the transmission transistor.

A metal wire (not shown) and a pad (not shown) are formed on the semiconductor substrate 110. In order to decrease signal delay, the metal wire and pad may be made of a metal having low resistivity, for example, aluminum (Al), copper (Cu), silver (Ag), and alloys thereof, but is not limited thereto. However, it is not limited to the structure, and the metal wire and pad may be disposed under the photo-sensing devices 50a and 50b.

The lower insulation layer 60 is formed on the metal wire and the pad. The lower insulation layer 60 may be made of an inorganic insulating material such as a silicon oxide and/or a silicon nitride, or a low dielectric constant (low K) material such as SiC, SiCOH, SiCO, and SiOF. The lower insulation layer 60 has a trench exposing the charge storage 55. The trench may be filled with fillers.

A color filter layer 70 is formed on the lower insulation layer 60. The color filter layer 70 includes a blue filter 70B formed in the blue pixel and a red filter 70R formed in the red pixel. In the present embodiment, a green filter is not included, but a green filter may be further included.

The upper insulation layer 80 is formed on the color filter layer 70. The upper insulation layer 80 eliminates a step caused by the color filter layer 70 and smoothens the surface. The upper insulation layer 80 and lower insulation layer 60 may include a contact hole (not shown) exposing a pad, and a through-hole 85 exposing the charge storage 55 of a green pixel.

The organic photoelectric device 200 is formed on the upper insulation layer 80. The organic photoelectric device 200 includes a lower electrode 210 and an upper electrode 220 facing each other and an absorption layer 230 disposed between the lower electrode 210 and the upper electrode 220.

The lower electrode 210 and the upper electrode 220 may be all light-transmitting electrodes and the absorption layer 230 may selectively absorb light in a green wavelength region and may replace a color filter of a green pixel.

In this way, the semiconductor substrate 110 and the organic photoelectric device 200 selectively absorbing light in a green wavelength region have a stacking structure and thereby the size of an image sensor may be reduced to realize a down-sized image sensor.

Focusing lens (not shown) may be further formed on the organic photoelectric device 200. The focusing lens may control a direction of incident light and gather the light in one region. The focusing lens may have a shape of, for example, a cylinder or a hemisphere, but is not limited thereto.

In FIGS. 5 and 6, a structure where the organic photoelectric device selectively absorbing light in a green wavelength region is stacked on the semiconductor substrate 110 is illustrated, but the present disclosure is not limited thereto. An organic photoelectric device selectively absorbing light in a blue wavelength region may be stacked on the semiconductor substrate 110 and a green photo-sensing device and a red photo-sensing device may be integrated in the semiconductor substrate 110 or an organic photoelectric device selectively absorbing light in a red wavelength region may be stacked on the semiconductor substrate 110 and a green photo-sensing device and a blue photo-sensing device may be integrated in the semiconductor substrate 110.

Among the light in a visible region passing the lens barrel 21 and the optical structure 10, light in a green wavelength region may be mainly absorbed in the absorption layer 30 and photoelectrically converted, and light in a blue wavelength region and a red wavelength region may pass the lower electrode 210 and be sensed by the photo-sensing devices 50a and 50b.

As described above, the optical structure 10 not only exhibits good optical properties, but also has good reliability in various environments such as high temperature/high humidity environments. Therefore, in the case of an electronic device including the aforementioned optical structure 10, light in a pure visible region may be transferred to an image sensor and resultantly a crosstalk generated when a signal by light in a visible region is crossed and mixed with a signal by light in a non-visible region may be reduced or prevented. Accordingly, an optical distortion phenomenon of the image sensor for example due to a used environment such as a high humidity environment and the like may be minimized, and a clear image may be obtained.

Figure 7:
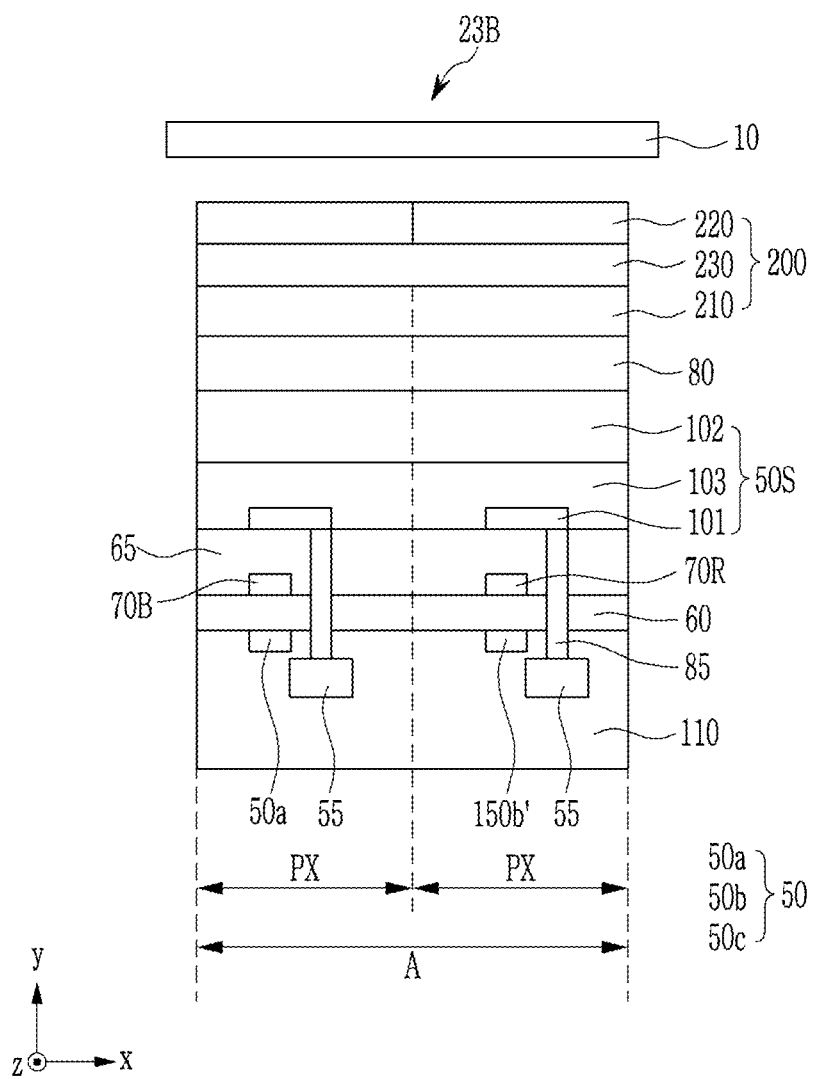
FIG. 7 is a cross-sectional view showing another example of an image sensor.

Referring to FIG. 7, the sensor 23B according to some example embodiments includes the visible light sensor 50, the organic photoelectric device 200, and the optical structure 10 as described above.

Referring to FIG. 7, in the sensor 23B according to some example embodiments, the visible light sensor 50 may be a combination of a photodiode integrated in the semiconductor substrate 110 and a photoelectric device disposed on the semiconductor substrate 110, and the organic photoelectric device 200 may be a separate photoelectric device. In some example embodiments, the same illustration as FIG. 6 will not be repeated, and accordingly, a description of the same constituent elements as those of FIG. 6 will be omitted.

In the semiconductor substrate 110, the blue sensor 50a, the red sensor 50b, the charge storage 55, and a transmission transistor (not shown) are integrated. The blue sensor 50a and the red sensor 50b are photodiodes and spaced apart from each other in a horizontal direction of the semiconductor substrate 110. The blue sensor 50a is integrated in a blue pixel, and the red sensor 50b is integrated in a red pixel.

On the semiconductor substrate 110, the lower insulation layer 60 and the color filter layer 70 are formed. The color filter layer 70 includes a blue filter 70B overlapped with the blue sensor 50a and a red filter 70R overlapped with the red sensor 50b.

An intermediate insulation layer 65 is formed on the color filter layer 70. The lower insulation layer 60 and the intermediate insulation layer 65 may have a through hole 85 exposing the charge storage 140. The through hole 85 may be filled with fillers. At least one of the lower insulation layer 60 and intermediate insulation layer 65 may be omitted.

On the intermediate insulation layer 65, the green sensor 50c is formed. The green sensor 50c may be a photoelectric device and formed at the whole surface of the sensor 23E. The green sensor 50c includes a lower electrode 101 and an upper electrode 102 facing each other, and a green light absorption layer 103 between lower electrode 101 and upper electrode 102. One of the lower electrode 101 and the upper electrode 102 is an anode and the other is a cathode.

Both of the lower electrode 101 and the upper electrode 102 may be a light-transmitting electrode, and the light-transmitting electrode may be made of, in some example embodiments, a transparent conductor such as indium tin oxide (ITO) or indium zinc oxide (IZO), or may be a metal thin layer having a thin thickness of several nanometers or several tens of nanometers or a metal thin layer having a thin thickness of several nanometers to several tens of nanometers doped with a metal oxide.

Figure 8:
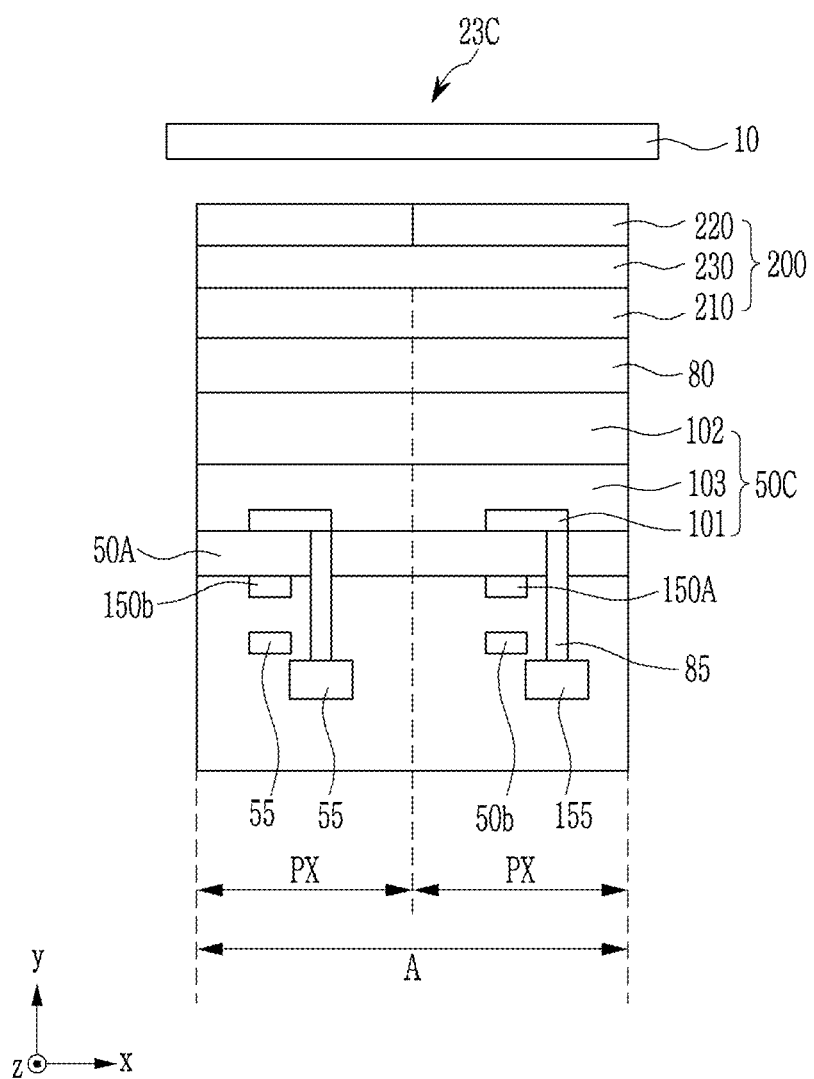
FIG. 8 is a cross-sectional view showing another example of an image sensor.

FIG. 8 is a cross-sectional view that schematically shows another example of a sensor according to some example embodiments.

Referring to FIG. 8, the sensor 23B according to some example embodiments includes the visible light sensor 50, the organic photoelectric device 200, and the optical structure 10 like that of some example embodiments. The visible light sensor 50 includes the blue sensor 50a and the red sensor 50b integrated in the semiconductor substrate 110 and a green sensor 50c disposed on the semiconductor substrate 110, wherein the blue sensor 50a and the red sensor 50b may be photodiodes, and the green sensor 50c may be a photoelectric device. The organic photoelectric device 200 may be a photoelectric device. The green sensor 50c includes a lower electrode 101, a green light absorption layer 103, and an upper electrode 102, and the organic photoelectric device 200 includes a lower electrode 210, a near infra-red absorption layer 230, and an upper electrode 220.

However, in the sensor 23C according to some example embodiments, the blue sensor 50a and the red sensor 50b integrated in the semiconductor substrate 110 are stacked in a vertical direction. The blue sensor 50a and the red sensor 50b may be configured to selectively absorb light in each wavelength region depending on a stacking depth and thus sense it. In other words, the red sensor 50b configured to absorb red light in a long wavelength region is disposed deeper from the surface of the semiconductor substrate 110 than the blue sensor 50a configured to absorb blue light in a short wavelength region. In this way, the color filter layer 70 may be omitted by separating absorption wavelengths depending on the stacking depth.

Figure 9:
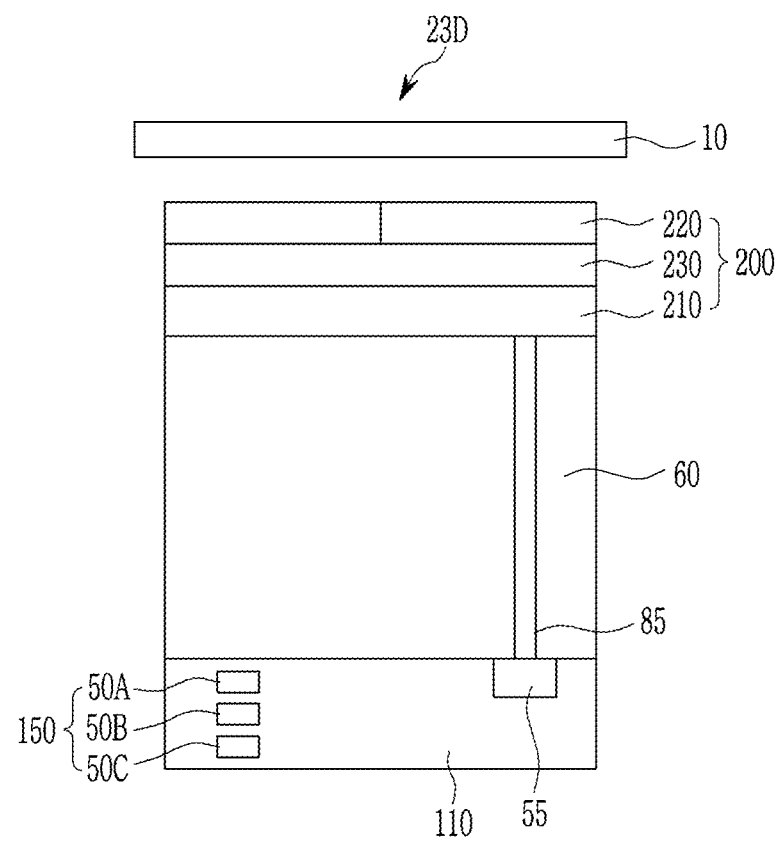
FIG. 9 is a cross-sectional view showing another example of an image sensor.

FIG. 9 is a cross-sectional view that schematically shows another example of a sensor according to some example embodiments.

Referring to FIG. 9, the sensor 23D according to some example embodiments includes the visible light sensor 50, the organic photoelectric device 200, and the optical structure 10 like that of some example embodiments. The visible light sensor 50 includes the blue sensor 50a and the red sensor 50b integrated in the semiconductor substrate 110 and a green sensor 50c disposed on the semiconductor substrate 110, wherein the blue sensor 50a and the red sensor 50b may be photodiodes, and the green sensor 50c may be a photoelectric device. The organic photoelectric device 200 may be a photoelectric device. The green sensor 50c includes a lower electrode 101, a green light absorption layer 103, and an upper electrode 102, and the organic photoelectric device 200 includes a lower electrode 210, a near infra-red absorption layer 230, and an upper electrode 220.

However, in the sensor 23D according to some example embodiments, the blue sensor 50a and the red sensor 50b integrated in the semiconductor substrate 110 are stacked in a vertical direction. The blue sensor 50a and the red sensor 50b may be configured to selectively absorb light in each wavelength region depending on a stacking depth and thus sense it. In other words, the red sensor 50b configured to absorb red light in a long wavelength region is disposed deeper from the surface of the semiconductor substrate 110 than the blue sensor 50a configured to absorb blue light in a short wavelength region. In this way, the color filter layer 70 may be omitted by separating absorption wavelengths depending on the stacking depth.

Figure 10:
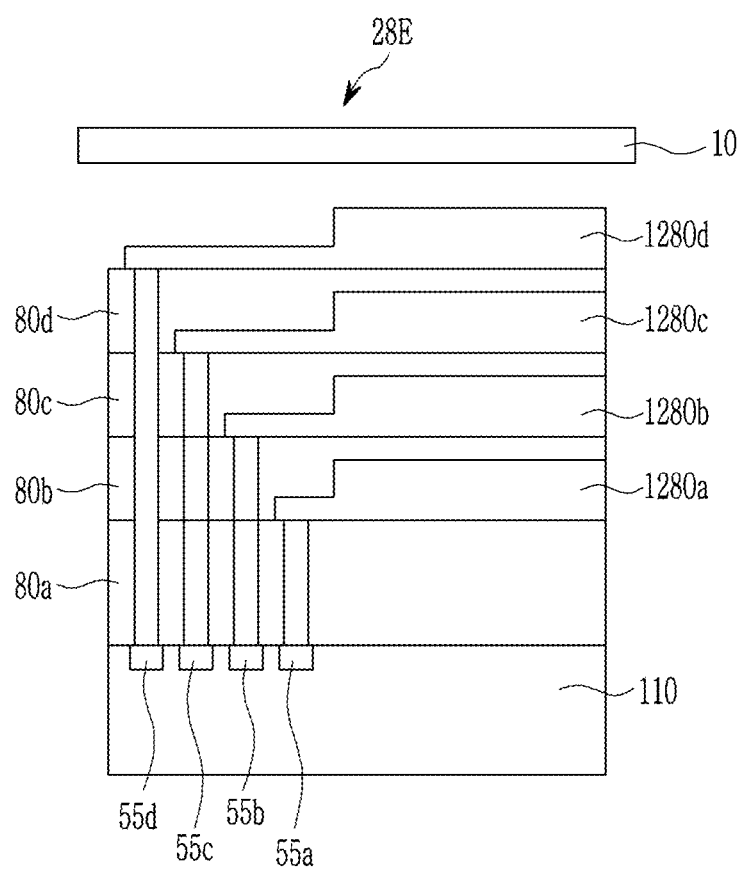
FIG. 10 is a cross-sectional view showing another example of an image sensor.

FIG. 10 is a cross-sectional view showing a sensor 23E according to some example embodiments.

Referring to FIG. 10, the sensor 23E according to some example embodiments includes an optical filter, an infrared/near infrared photoelectric diode configured to selectively absorb light in an infrared/near infrared wavelength spectrum of light, a red photoelectric diode configured to selectively absorb and convert (into electric signals) light in a red wavelength spectrum of incident light, a green photoelectric diode configured to selectively absorb and convert (into electric signals) light in a green wavelength spectrum of incident light, a blue photoelectric diode configured to selectively absorb and convert (into electric signals) light in a blue wavelength spectrum of incident light, and they are stacked in the vertical direction (e.g., Z-direction). Accordingly, it will be understood that, as shown in FIG. 10, the sensor 23E may include a plurality of photoelectric diodes 1200a-1200d that are stacked vertically on the semiconductor substrate 110, such that the plurality of photoelectric diodes 1200a-1200d overlap each other in a direction extending perpendicular to a top surface 110S of the semiconductor substrate 110.

The sensor 23E according to some example embodiments includes a semiconductor substrate 110, a lower insulation layer 80a, an intermediate insulation layer 80b, another intermediate insulation layer 80c, an upper insulation layer 80d, a first photoelectric diode 1200a, a second photoelectric diode 1200b, a third photoelectric diode 1200c, and a fourth photoelectric diode 1200d. As shown, the first to fourth photoelectric diode 1200a to 1200d are stacked vertically on the semiconductor substrate 110, such that the first to fourth photoelectric diode 1200a to 1200d overlap each other in a direction extending perpendicular to a top surface 110S of the semiconductor substrate 110.

The semiconductor substrate 110 may be a silicon substrate, and is integrated with the transmission transistor (not shown) and charge storages.

The first photoelectric diode 1200a is formed on the lower insulation layer 80a. The first photoelectric diode 1200a includes a photoelectric conversion layer 1230a. The first photoelectric diode 1200a may be any one of the photoelectric diodes described herein with reference to FIGS. 6-9. The photoelectric conversion layer 1230a may selectively absorb and convert (into electric signals) light in one of infrared, red, blue, and green wavelength spectra of incident light. For example, the first photoelectric diode 1200a may be a blue photoelectric diode.

An intermediate insulation layer 80b is formed on the first photoelectric diode 1200a.

The second photoelectric diode 1200b is formed on the intermediate insulation layer 80b. The second photoelectric 1200b includes a photoelectric conversion layer 1230b. The second photoelectric diode 1200b may be any one of the photoelectric diodes described herein with reference to FIGS. 1-7. The photoelectric conversion layer 1230b may selectively absorb and convert (into electric signals) light in one of infrared, red, blue, and green wavelength spectra of incident light. For example, the second photoelectric diode 1200b may be a green photoelectric diode.

Another intermediate insulation layer 80c is formed on the second photoelectric diode 1200b.

The third photoelectric diode 1200c is formed on the intermediate insulation layer 80c. The third photoelectric diode 1200c includes a photoelectric conversion layer 1230c. The third photoelectric diode 1200c may be any one of the photoelectric diodes described herein with reference to FIGS. 6-9. The photoelectric conversion layer 1230c may selectively absorb and convert (into electric signals) light in one of infrared, red, blue, and green wavelength spectra of incident light. For example, the third photoelectric diode 1200c may be a red photoelectric diode.

The upper insulation layer 80d is formed on the third photoelectric diode 1200c.

The lower insulation layer 80a, the intermediate insulation layers 80b and 80c, and the upper insulation layer 80d have a plurality of through-holes exposing the charge storages 55a, 55b, 55c, and 55d.

The fourth photoelectric diode 1200d is formed on the upper insulation layer 80d. The fourth photoelectric diode 1200d includes a photoelectric conversion layer 1230d. The fourth photoelectric diode 1200d may be any one of the photoelectric diodes described herein with reference to FIGS. 6-9. The photoelectric conversion layer 1230d may selectively absorb light in one of infrared, red, blue, and green wavelength spectra of light. For example, the fourth photoelectric diode 1200d may be an infrared/near infrared photoelectric diode.

As shown, an optical structure 10 may be on the fourth photoelectric diode 1200d.

In the drawing, the first photoelectric diode 1200a, the second photoelectric diode 1200b, the third photoelectric diode 1200c, and the fourth photoelectric diode 1200d are sequentially stacked, but the present disclosure is not limited thereto, and they may be stacked in various orders.

As described above, the first photoelectric diode 1200a, the second photoelectric diode 1200b, the third photoelectric diode 1200c, and the fourth photoelectric diode 1200d have a stack structure, and thus the size of an image sensor may be reduced to realize a down-sized image sensor.

Figure 11:
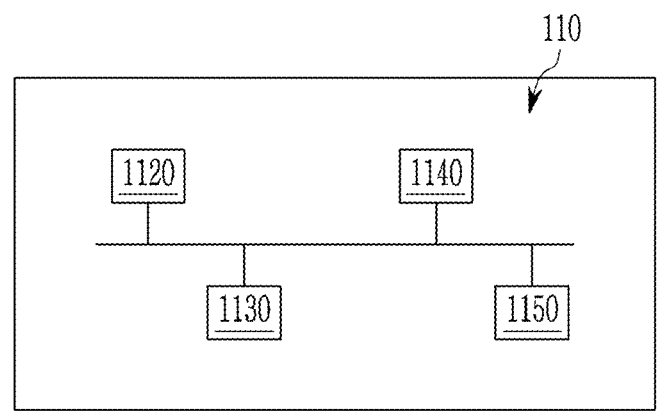
FIG. 11 is a schematic diagram of an electronic device 1300 according to some example embodiments.

FIG. 11 is a schematic diagram of an electronic device 1300 according to some example embodiments.

As shown in FIG. 11, an electronic device 150 may include a processor 1120, a memory 1130, image sensor device 1140, and display device 1150 that are electrically coupled together via a bus 1110. The image sensor device 1140 may include any of the sensors 23 of any of the example embodiments as described herein. The memory 1130, which may be a non-transitory computer readable medium, may store a program of instructions. The processor 1120 may execute the stored program of instructions to perform one or more functions. The processor 1120 may further may execute the stored program of instructions to display the generated image on display device 1150. The processor 1120 may be configured to generate an output (e.g., an image to be displayed on the display device 1150).

Hereinafter, the embodiments are illustrated in more detail with reference to examples. However, these are example embodiments, and the present scope is not limited thereto.

Preparation of Copper Salt 6.28 g of trifluoromethylacetic acid (TCI), 11.57 g of phosphoric acid 2-hydroxy metacryl ester (Sigma-Aldrich Corp.), and 10 g of copper(II) acetate (Alfa Aesar) are dissolved in a tetrahydrofuran solvent with a stirrer, and 6.28 g of trifluoromethylacetic acid is added thereto and reacted therewith at room temperature for 1 day. 11.57 g of phosphoric acid 2-hydroxy metacryl ester (Sigma-Aldrich Corp.) is added to the reaction solution and then, reacted at room temperature for 1 day. As for non-reactants in the reaction solution are removed with a syringe filter, and after removing about ½ of tetrahydrofuran with a rotary evaporator, the reaction mixture is precipitated in hexane and dried in a vacuum oven at room temperature to 50° C. for 12 hours to prepare a copper salt represented by Chemical Formula 1-A.

[Chemical Formula 1-A]

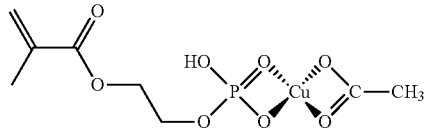

Evaluation 1: Whether or not Different Nitrogen-Containing Compound (Thio-Amide Compound) is Appropriate as Ligand of Copper Salt The aforementioned copper salt represented by Chemical Formula 1-A is dissolved in propylene glycolmonomethylether at a concentration of 1.0 g/volume %, and additionally, a content of a thio-amide compound (N-phenyl thiobenzamide) is increased from 0 g to 200 g based on 100 g of the copper salt to prepare copper complex solutions according to Verification Examples 1 to 6.

Each wavelength versus light absorption rate graph of the solutions according to Verification Examples 1 to 6 is calculated by using a UV-Vis spectrophotometer (SoldiSpec-3700, Shimadzu Scientific Instruments).

Figure 12:
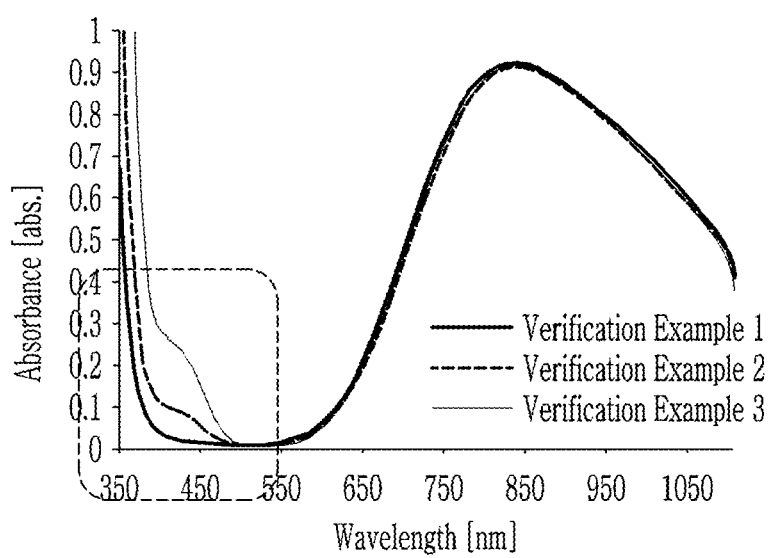
FIG. 12 is a graph showing wavelengths versus light absorption rates of the solutions according to Verification Example 1 to Verification Example 3.

Among the calculated graphs, the wavelengths versus light absorption rate graphs of the solutions according to Verification Examples 1 to 3 are shown in FIG. 12.

On the other hand, a specific content of the thio-amide compound (N-phenyl thiobenzamide) based on 100 g of the copper salt in the solution and whether or not haze is generated are shown in Table 1. In addition, whether not the solutions according to Verification Examples 1 to 6 are precipitated is examined with naked eyes, and the results are shown in Table 1.

TABLE 1

|  | Verification Example 1 | Verification Example 2 | Verification Example 3 | Verification Example 4 | Verification Example 5 | Verification Example 6 |
|---|---|---|---|---|---|---|
| Content [g] | 0 | 0.5 | 1.5 | 60 | 130 | 200 |
| Precipitation | X DELETED TEXTS | X DELETED TEXTS | X DELETED TEXTS | ○ DELETED TEXTS | ○ DELETED TEXTS | ○ DELETED TEXTS |

FIG. 12 is a graph showing wavelengths versus light absorption rate of the solutions according to Verification Examples 1 to 3.

Referring to Table 1, when the copper salt is included without the thio-amide compound (Verification Example 1) and with the thio-amide compound (Verification Examples 2 to 6), haze is all generated.

In addition, referring to FIG. 12, when a content of the thio-amide compound is increased, absorbance in a visible wavelength region is gradually increased.

In addition, when the thio-amide compound is included in an excessive amount (Verification Examples 4 to 6), a precipitate is formed in the solutions and may deteriorate formability of a near-infrared absorption layer.

Accordingly, referring to the results of Evaluation 1, a case of using a nitrogen-containing thio-amide compound instead of an amine compound greatly deteriorates visible light absorbance and thus may not be appropriate as a composition for forming an optical structure, but when excessively used, formability of a near-infrared absorption layer may also be insufficient.

Evaluation 2: Whether or not Different Nitrogen-Containing Compound (Amide Compound) is Appropriate as Ligand of Copper Salt 6.0 g of the aforementioned copper salt represented by Chemical Formula 1-A is dissolved in 6.0 g of tetrahydrofuran, 3.0 g of trimethylolpropane triacrylate (TMPTA, Sigma-Aldrich Corp.), 0.8 g of an epoxy binder (EHPE-3150, Daicel Corp.), and 0.1 g of a photoinitiator (Irgacure® 184, BASF SE) are mixed therewith to prepare a near-infrared absorbing composition.

Subsequently, the near-infrared absorbing composition is coated through bar #70-coating on an about 100 μm-thick cycloolefin polymer (COP, ZEON Corp.) film, dried for 5 minutes in a 65° C. drying oven, and photocured with about 400 mJ of UV light to manufacture an optical structure according to Verification Example 7.

On the other hand, 6.0 g of the aforementioned copper salt represented by Chemical Formula 1-A and 1.2 g of dimethylacetateamide (DMAc, Sigma-Aldrich Corp.) are dissolved in 4.8 g of tetrahydrofuran and then, mixed with 3.0 g of trimethylolpropane triacrylate (TMPTA, Sigma-Aldrich Corp.), 0.8 g of an epoxy binder (EHPE-3150, Daicel Corp.), and 0.1 g of a photoinitiator (Irgacure® 184, BASF SE) to prepare a near-infrared absorbing composition.

Subsequently, the prepared near-infrared absorbing composition is coated through bar #70-coating on an about 100 μm-thick cycloolefin polymer (COP, ZEON Corp.) film, dried for 5 minutes in a 65° C. drying oven, and photocured with about 400 mJ of UV light to manufacture an optical structure according to Verification Example 8.

Figure 13:
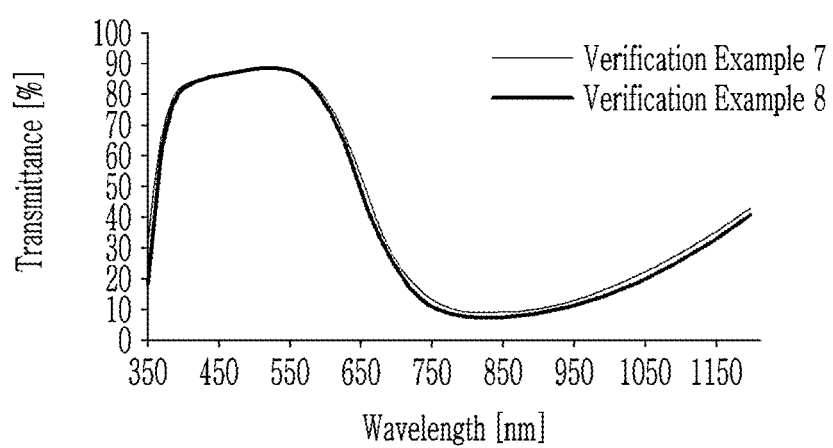
FIG. 13 is a graph showing wavelengths versus light transmittances of the optical structures according to Verification Examples 7 to 8.

Then, each wavelength versus light transmittance graph of the optical structures according to Verification Examples 7 to 8 is calculated by using a UV-Vis spectrophotometer (SoldiSpec-3700, Shimadzu Scientific Instruments) and then, shown in FIG. 13.

In addition, average light transmittances in each wavelength region, which is obtainable from the aforementioned graphs are respectively summarized in Table 2.

TABLE 2

| | Average light transmittance in each wavelength region [%] | | | | | |
|---|---|---|---|---|---|---|
| | 430-565 nm | 700-740 nm | 741-850 nm | 851-950 nm | 951-1100 nm | 1101-1200 nm |
| Verification Example 7 | 87.6 | 19.4 | 9.8 | 10.5 | 19.5 | 35.6 |
| Verification Example 8 | 87.5 | 17.3 | 8.7 | 9.5 | 18.4 | 34.6 |

FIG. 13 is a graph showing wavelengths versus light transmittances of the optical structures according to Verification Example 7 to 8.

Referring to FIG. 13 and Table 2, the optical structures according to Verification Examples 7 to 8 exhibit almost similar light transmittances regardless of including dimethylacetate amide.

In other words, even though the nitrogen-containing amide compound instead of the amine compound is used, an effect of significantly improving optical properties due to the copper salt may not be obtained, and accordingly, even though the amide compound is used as a ligand of the copper salt, the optical properties obtained due to the amine compound according to an embodiment may not be obtained.

Manufacture of Optical Structure

Example 1

55 wt % of the aforementioned copper salt represented by Chemical Formula 1-A, 27 wt % of trimethylolpropane triacrylate (TMPTA, Sigma-Aldrich Corp.), 7 wt % of an epoxy binder (EHPE-3150, Daicel Corp.), 6 wt % of N,N-diisopropylethylamine (DIPEA, a boiling point: 127° C., Sigma-Aldrich Corp.) as a first amine compound, and 5 wt % of (N,N-dimethylaminoethyl)methacrylate (DMM, Sigma-Aldrich Corp.) as a second amine compound are dissolved in tetrahydrofuran, and 3 parts by weight of a photoinitiator (Irgacure® 184, BASF SE) based on 100 parts by weight of TMPTA is added thereto to prepare a near-infrared absorbing composition.

Subsequently, the near-infrared absorbing composition is coated on an about 100 μm-thick cycloolefin polymer (COP, ZEON Corp.) film through bar #70-coating, dried in a 65° C. drying oven for 10 minutes, and photocured with about 500 mJ to 3000 mJ of UV light to manufacture an optical structure according to Example 1.

Example 2

An optical structure according to Example 2 is manufactured according to the same method as Example 1 except that 54.4 wt % of the aforementioned copper salt represented by Chemical Formula 1-A, 28.6 wt % of trimethylolpropane triacrylate (TMPTA, Sigma-Aldrich Corp.), 6.9 wt % of an epoxy binder (EHPE-3150, Daicel Corp.), 5.1 wt % of N,N-diisopropylethylamine (DIPEA, Sigma-Aldrich Corp.) as a first amine compound, and 5.1 wt % of (N,N-dimethylaminoethyl)methacrylate (DMM, Sigma-Aldrich Corp.) as a second amine compound are used.

Example 3

An optical structure according to Example 3 is manufactured according to the same method as Example 1 except that 54.4 wt % of the aforementioned copper salt represented by Chemical Formula 1-A, 28.6 wt % of trimethylolpropane triacrylate (TMPTA, Sigma-Aldrich Corp.), 6.9 wt % of an epoxy binder (EHPE-3150, Daicel Corp.), 5.1 wt % of tributylamine (TBA, a boiling point: 214° C., Sigma-Aldrich Corp.) as a first amine compound, and 5.1 wt % of (N,N-dimethylaminoethyl)methacrylate (DMM, Sigma-Aldrich Corp.) as a second amine compound are used.

Example 4

An optical structure according to Example 4 is manufactured according to the same method as Example 1 except that 54.4 wt % of the aforementioned copper salt represented by Chemical Formula 1-A, 28.6 wt % of trimethylolpropane triacrylate (TMPTA, Sigma-Aldrich Corp.), 6.9 wt % of an epoxy binder (EHPE-3150, Daicel Corp.), 5.1 wt % of triisobutylamine (TIBA, a boiling point: 131° C., Sigma-Aldrich Corp.) as a first amine compound, and 5.1 wt % of (N,N-dimethylaminoethyl)methacrylate (DMM, Sigma-Aldrich Corp.) as a second amine compound are used.

Example 5

An optical structure according to Example 5 is manufactured according to the same method as Example 1 except that 54.5 wt % of the aforementioned copper salt represented by Chemical Formula 1-A, 28.6 wt % of trimethylolpropane triacrylate (TMPTA, Sigma-Aldrich Corp.), 6.9 wt % of an epoxy binder (EHPE-3150, Daicel Corp.), 7.6 wt % of dicyclohexylmethylamine (DCHMA, a boiling point: 265° C., Sigma-Aldrich Corp.) as a first amine compound, and 5.2 wt % of (N,N-dimethylaminoethyl)methacrylate (DMM, Sigma-Aldrich Corp.) as a second amine compound are used.

Example 6

An optical structure according to Example 6 is manufactured according to the same method as Example 1 except that 54.4 wt % of the aforementioned copper salt represented by Chemical Formula 1-A, 28.6 wt % of trimethylolpropane triacrylate (TMPTA, Sigma-Aldrich Corp.), 6.9 wt % of an epoxy binder (EHPE-3150, Daicel Corp.), 6.5 wt % of N,N-diisopropylethylamine (DIPEA, Sigma-Aldrich Corp.) as a first amine compound, and 5.1 wt % of (N,N-dimethylaminoethyl)methacrylate (DMM, Sigma-Aldrich Corp.) as a second amine compound are used.

Example 7

An optical structure according to Example 7 is manufactured according to the same method as Example 1 except that 54.4 wt % of the aforementioned copper salt represented by Chemical Formula 1-A, 28.6 wt % of trimethylolpropane triacrylate (TMPTA, Sigma-Aldrich Corp.), 6.9 wt % of an epoxy binder (EHPE-3150, Daicel Corp.), 6.4 wt % of diisopropylethylamine (DIPEA, Sigma-Aldrich Corp.) as a first amine compound, and 6.4 wt % of (N,N-dimethylaminoethyl)methacrylate (DMM, Sigma-Aldrich Corp.) as a second amine compound are used.

Comparative Example 1

An optical structure according to Comparative Example 1 is manufactured according to the same method as Example 1 except that 57 wt % of the aforementioned copper salt represented by Chemical Formula 1-A, 7 wt % of trimethylolpropane triacrylate (TMPTA, Sigma-Aldrich Corp.), and 29 wt % of an epoxy binder (EHPE-3150, Daicel Corp.) are used, but the first and second amine compounds are not included.

Comparative Example 2

An optical structure according to Comparative Example 2 is manufactured according to the same method as Example 1 except that 57 wt % of the aforementioned copper salt represented by Chemical Formula 1-A, 7 wt % of trimethylolpropane triacrylate (TMPTA, Sigma-Aldrich Corp.), 29 wt % of an epoxy binder (EHPE-3150, Daicel Corp.), and 7 wt % of (N,N-dimethylaminoethyl)methacrylate (DMM, Sigma-Aldrich Corp.) as a second amine compound are used, but the aforementioned first amine compound is not included.

Comparative Example 3

An optical structure according to Comparative Example 3 is manufactured according to the same method as Example 1 except that 57 wt % of the aforementioned copper salt represented by Chemical Formula 1-A, 7 wt % of trimethylolpropane triacrylate (TMPTA, Sigma-Aldrich Corp.), 29 wt % of an epoxy binder (EHPE-3150, Daicel Corp.), and 7 wt % of N,N-diisopropylethylamine (DIPEA, Sigma-Aldrich Corp.) as a first amine compound are used, but the aforementioned first amine compound is not included.

Comparative Example 4

An optical structure according to Comparative Example 4 is manufactured according to the same method as Comparative Example 2 except that 57 wt % of trimethylolpropane triacrylate (TMPTA, Sigma-Aldrich Corp.) and 7 wt % of an epoxy binder (EHPE-3150, Daicel Corp.) are used.

Comparative Example 5

An optical structure according to Comparative Example 5 is manufactured according to the same method as Comparative Example 3 except that 29 wt % of trimethylolpropane triacrylate (TMPTA, Sigma-Aldrich Corp.) and 7 wt % of an epoxy binder (EHPE-3150, Daicel Corp.) are used.

Comparative Example 6

An optical structure according to Comparative Example 6 is manufactured according to the same method as Example 1 except that 57 wt % of the aforementioned copper salt represented by Chemical Formula 1-A, 29 wt % of trimethylolpropane triacrylate (TMPTA, Sigma-Aldrich Corp.), 7 wt % of an epoxy binder (EHPE-3150, Daicel Corp.), 5 wt % of diisopropylethylamine (DIPEA, Sigma-Aldrich Corp.) as a first amine compound, and 10 wt % of (N,N-dimethylaminoethyl)methacrylate (DMM, Sigma-Aldrich Corp.) as a second amine compound are used. However, a near-infrared absorbing composition prepared by adjusting a content ratio of the aforementioned components is partially gelated due to agglomeration of a copper complexing agent and not formed into a coating layer.

Evaluation 3: Optical Properties and High Temperature/High Humidity Reliability of Optical Structure Each wavelength versus light transmittance graph of the optical structures according to Examples 1 to 5 and Comparative Examples 1 to 5 is calculated by using a UV-Vis spectrophotometer (SoldiSpec-3700, Shimadzu Scientific Instruments).

Subsequently, when complete with the measurement, the optical structures are put in a high temperature/high humidity chamber (ARS-0220-AE, ESPEC Corp.) and placed at 80° C. under relative humidity of 85 RH % for predetermined time (at least 24 hours, at most 120 hours). Then, the UV-Vis spectrophotometer (SoldiSpec-3700, Shimadzu Scientific Instruments) is used to calculate each wavelength versus light transmittance graph of the optical structures exposed to the high temperature/high humidity environment as a high temperature/high humidity evaluation result.

Figure 14:
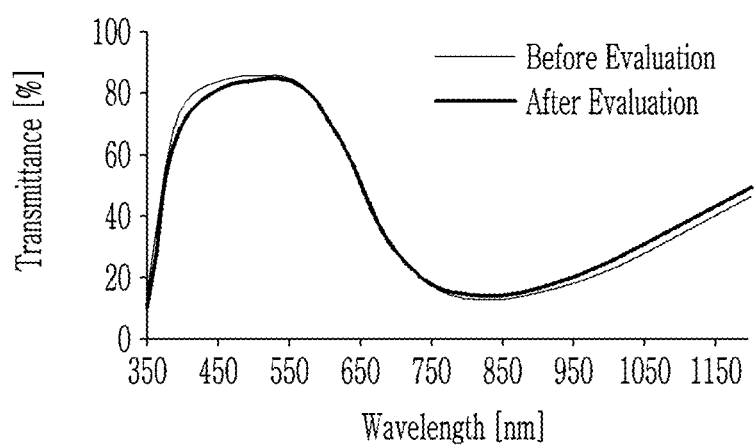
FIGS. 14 to 22 are graphs showing wavelengths versus light transmittance of the optical structures according to Example 1 to 5 and Comparative Examples 1 to 5 before and after high temperature/high humidity evaluation.
Figure 15:
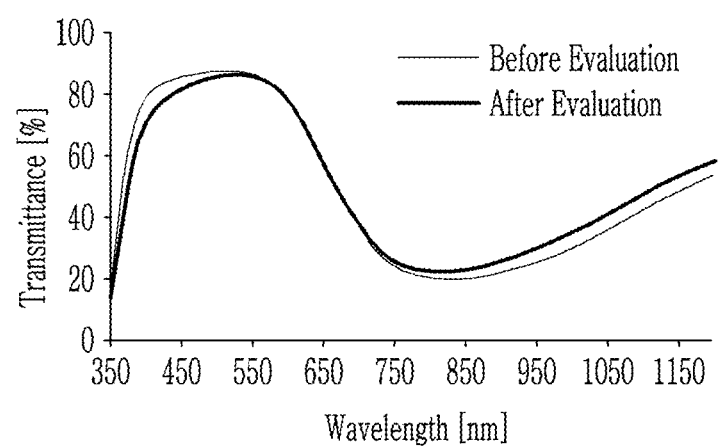
Figure 16:
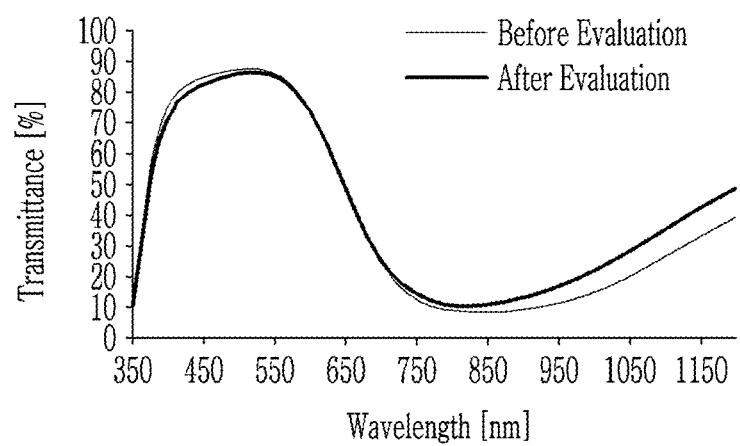
Figure 17:
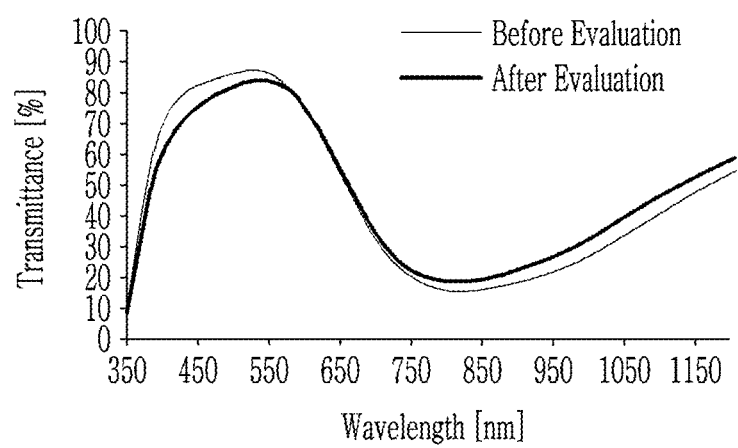
Figure 18:
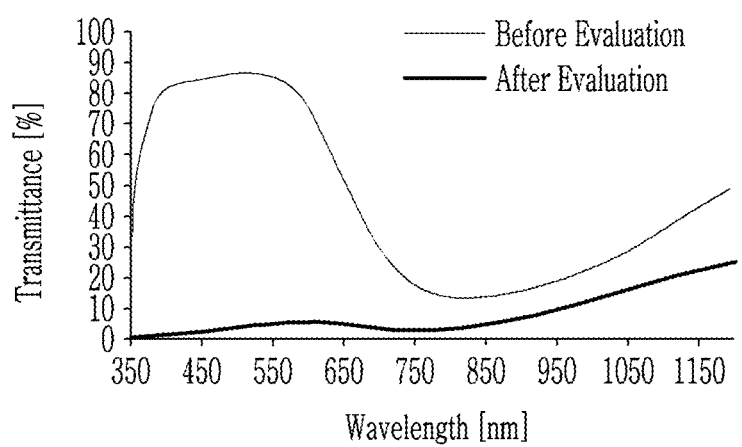
Figure 19:
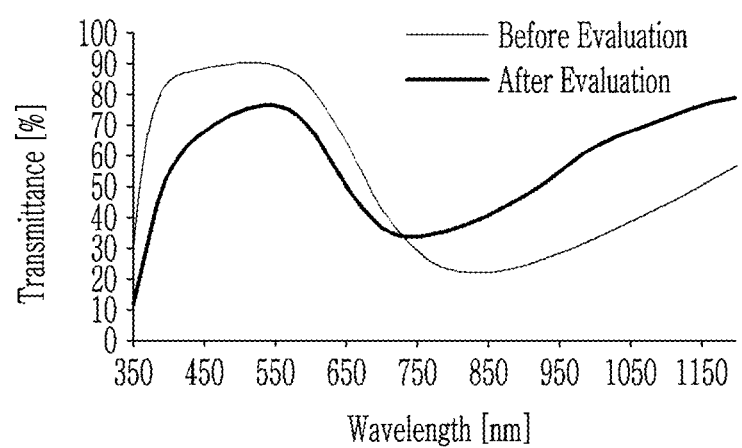
Figure 20:
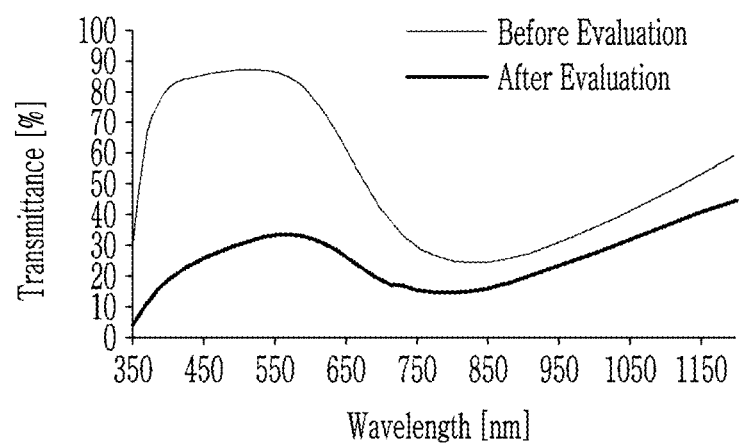
Figure 21:
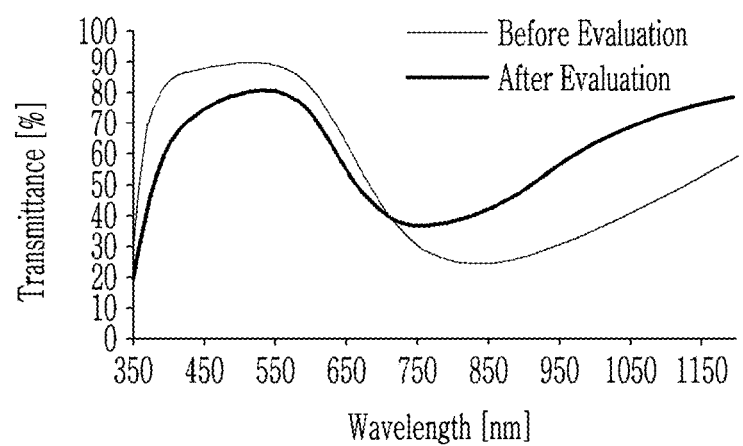
Figure 22:
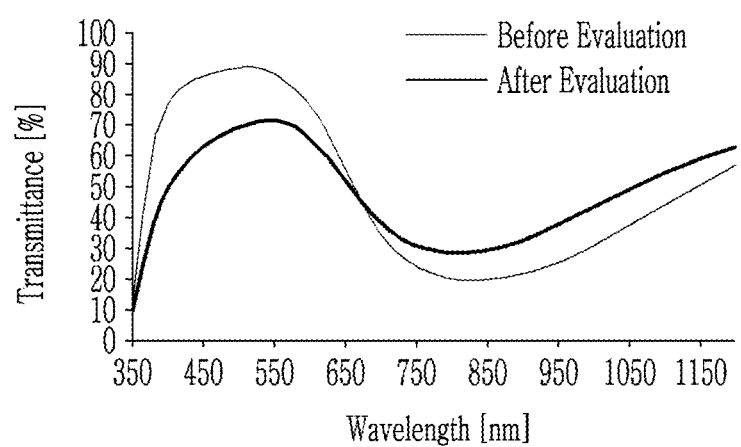

The obtained graphs are respectively shown in FIG. 14 (Example 2), FIG. 15 (Example 3), FIG. 16 (Example 4), FIG. 17 (Example 5), FIG. 18 (Comparative Example 1), FIG. 19 (Comparative Example 2), FIG. 20 (Comparative Example 3), FIG. 21 (Comparative Example 4), and FIG. 22 (Comparative Example 5), and in FIGS. 14 to 22, each graph corresponding to Examples or Comparative Examples before and after the high temperature/high humidity evaluation is also shown.

On the other hand, initial average light transmittances in each wavelength region, average light transmittances in each wavelength region after the high temperature/high humidity evaluation, changes of average light transmittances in each wavelength region before and after the high temperature/high humidity evaluation (A, a difference obtained by subtracting the initial average light transmittance before the high temperature/high humidity evaluation from the average light transmittance after the high temperature/high humidity evaluation), which are induced from the graphs of FIGS. 14 to 22, and specific time conditions for being placed under the high temperature/high humidity are shown in Table 3.

TABLE 3

| Conditions | | Average light transmittance in each wavelength region [%] | | |
|---|---|---|---|---|
| | | 430 nm-565 nm | 950 nm-1100 nm | 1100 nm-1200 nm |
| Example 1 | (1) initial (0 hour) | 88 | 32.1 | 47.7 |
| | (2) after being placed for 120 hours | 83.3 | 36.7 | 51.9 |
| | Δ[(2)-(1)] | -4.7 | 4.6 | 4.2 |
| Example 2 | (1) initial (0 hour) | 86.3 | 26.1 | 41.7 |
| | (2) after being placed for 24 hours | 84.8 | 28.9 | 44.7 |
| | Δ[(2)-(1)] | -1.5 | 2.8 | 3 |
| Example 3 | (1) initial (0 hour) | 88.4 | 33.8 | 49.3 |
| | (2) after being placed for 24 hours | 86 | 39 | 54.1 |
| | Δ[(2)-(1)] | -2.5 | 5.1 | 4.8 |
| Example 4 | (1) initial (0 hour) | 86.9 | 18.1 | 32.9 |
| | (2) after being placed for 24 hours | 85.4 | 25.7 | 42.7 |
| | Δ[(2)-(1)] | -1.5 | 7.5 | 9.8 |
| Example 5 | (1) initial (0 hour) | 84.6 | 31.7 | 48.5 |
| | (2) after being placed for 24 hours | 80.5 | 37.2 | 53.8 |
| | Δ[(2)-(1)] | -4.1 | 5.5 | 5.3 |
| Comparative Example 1 | (1) initial (0 hour) | 88.6 | 27 | 43.7 |
| | (2) after being placed for 120 hours | 3.1 | 14.4 | 22.4 |
| | Δ[(2)-(1)] | -86.5 | -12.6 | -21.3 |
| Comparative Example 2 | (1) initial (0 hour) | 89.6 | 36.4 | 51.6 |
| | (2) after being placed for 120 hours | 74.3 | 65.4 | 76.2 |
| | Δ[(2)-(1)] | -15.3 | 29 | 24.6 |
| Comparative Example 3 | (1) initial (0 hour) | 88.5 | 39.8 | 55.3 |
| | (2) after being placed for 24 hours | 30.8 | 30.8 | 42.6 |
| | Δ[(2)-(1)] | -57.8 | -9 | -12.7 |
| Comparative Example 4 | (1) initial (0 hour) | 89.5 | 37.3 | 52.5 |
| | (2) after being placed for 24 hours | 78.5 | 65.8 | 76.5 |
| | Δ[(2)-(1)] | -11 | 28.4 | 24 |
| Comparative Example 5 | (1) initial (0 hour) | 88.7 | 37.4 | 53 |
| | (2) after being placed for 62 hours | 65.2 | 41.1 | 56 |
| | Δ[(2)-(1)] | -23.5 | 3.7 | 3 |

Referring to Table 3 and FIGS. 14 to 22, the optical structures of Examples exhibit improved initial average light transmittance and in addition, improved changes (Δ) of the average light transmittance before and after the high temperature/high humidity evaluation compared with those of Comparative Examples. In particular, Example 2 exhibits an excellent Δ value even though being placed under a high temperature/high humidity environment up to 120 hours.

On the other hand, Comparative Example 1 including no amine compound exhibits a negative Δ value in a wavelength region of 430 nm to 565 nm and accordingly, may not secure appropriate transparency and thus not be used as an optical structure.

In addition, Comparative Examples 2 and 3 including any one among different types of amine compounds exhibit a greatly increased A value in a wavelength region of 950 nm to 1200 nm and accordingly, may not well exhibit near-infrared absorptivity (Comparative Example 2) or may exhibit a largely deteriorated A value in the wavelength region of 430 nm to 565 nm and thus not secure appropriate transparency (Comparative Example 3).

On the other hand, when a content ratio of a polymerizable cross-linking monomer is changed, while each composition ratio of the different types of amine compounds is equally maintained (Comparative Examples 2 and 4, Comparative Examples 3 and 5), Comparative Examples 4 and 5 including the acryl-based cross-linking monomer a little more than the acryl-based cross-linking monomer exhibit a little more excellent Δ value. However, since Comparative Examples 4 and 5 also include any one of the different types of amine compounds, the Δ values in each wavelength region are largely deteriorated compared with those of Examples.

Accordingly, referring to the results of Evaluation 3, when the copper salt and the different types of amine compounds are used together to form an optical structure, this formed optical structure has excellent optical properties and high temperature/high humidity reliability compared with a case of using one type of an amine compound alone or including no amine compound.

Evaluation 4: Optical Properties and High Temperature/High Humidity Reliability of Optical Structure Depending on Content of Amine Compound Each wavelength versus light transmittance graph of the optical structures of Examples 6 to 7 and the final product of Comparative Example 6 is calculated by using a UV-Vis spectrophotometer (SoldiSpec-3700, Shimadzu Scientific Instruments).

Subsequently, when complete with the measurement, the optical structures are put in a high temperature/high humidity chamber (ARS-0220-AE, ESPEC Corp.) and placed at 80° C. under relative humidity of 85 RH % for 120 hours. Then, each wavelength versus light transmittance graph of the optical structures is calculated as a high temperature/high humidity evaluation result of the optical structures exposed to the high temperature/high humidity environment by using a UV-Vis spectrophotometer (SoldiSpec-3700, Shimadzu Scientific Instruments).

Subsequently, initial average light transmittance in each wavelength region and an average light transmittance change before and after the average high temperature/high humidity evaluation in each wavelength region (Δ, a difference obtained by subtracting the initial average light transmittance before the high temperature/high humidity evaluation from the average light transmittance after the high temperature/high humidity evaluation), which are induced from the aforementioned graphs, are shown in Table 4.

TABLE 4

| | | Average light transmittance in each wavelength region [%] | | |
| --- | --- | --- | --- | --- |
| | Conditions | 430 nm-565 nm | 950 nm-1100 nm | 1100 nm-1200 nm |
| Example 6 | initial (0 hour) | 86.6 | 36.9 | 53.4 |
| | Δ | -6.7 | 4.6 | 3.9 |
| Example 7 | initial (0 hour) | 86.5 | 35.7 | 52.6 |
| | Δ | -8.0 | 4.7 | 3.8 |
| Comparative Example 6 | initial (0 hour) | 85.3 | 33.3 | 50.2 |
| | Δ | -14.3 | 8.2 | 7.2 |

Referring to Table 4, excellent initial optical properties and reliability with respect to high temperature/high humidity in each wavelength region may be obtained by adjusting the amine compound to have a predetermined content ratio relative to a solid of a near-infrared absorbing composition and/or the different types of the amine compounds to have a predetermined content ratio.

On the contrary, as for Comparative Examples 6 including an excessive amount of the amine compound compared with Examples 6 to 7, the near-infrared absorbing composition is partially agglomerated and gelated, and accordingly, the final product has greatly deteriorated surface uniformity and thus would better not be applied to an optical structure.

Accordingly, referring to the results of Table 4, an optical structure having excellent initial optical properties and reliability with respect to high temperature/high humidity in each wavelength region may be manufactured by adjusting the copper salt and the different types of the amine compounds in the aforementioned contents and/or content ratio.

While this disclosure has been described in connection with what is presently considered to be practical example embodiments, it is to be understood that the inventive concepts are not limited to the disclosed embodiments. On the contrary, it is intended to cover various modifications and equivalent arrangements included within the spirit and scope of the appended claims.

What is claimed is:

1. A near-infrared absorbing composition, comprising
a copper salt capable of absorbing light in a near-infrared wavelength region;
a first amine compound having no polymerizable functional group; and
a second amine compound comprising at least a monofunctional polymerizable functional group,
wherein the copper salt is represented by Chemical Formula 3-1:

[Chemical Formula 3-1]

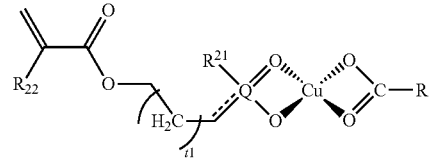

wherein in Chemical Formula 3-1,
Q is phosphorous or sulfur,
t1 is an integer of 0 to 8,
R is a substituted or unsubstituted C1 to C19 alkyl group, and
$R^{21}$ and $R^{22}$ are each independently hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, —$OR^{b1}$, —$C(=O)R^{b2}$, —$OC(=O)R^{b3}$, wherein $R^{b1}$, $R^{b2}$, and $R^{b3}$ are each independently hydrogen, a substituted or unsubstituted C1 to C20 alkyl group, a substituted or unsubstituted C12 to C20 alkenyl group, a substituted or unsubstituted C6 to C20 aryl group, or a substituted or unsubstituted C3 to C20 heteroaryl group, or a functional group represented by Chemical Formula X:

[Chemical Formula X]

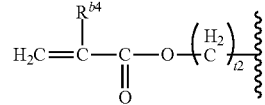

wherein in Chemical Formula X,
$R^{b4}$ is hydrogen, a substituted or unsubstituted C1 to C20 alkyl group, a substituted or unsubstituted C1 to C20 heteroalkyl group, a substituted or unsubstituted C6 to C20 aryl group, or a substituted or unsubstituted C3 to C20 heteroaryl group, and t2 is an integer of 0 to 8.

2. The near-infrared absorbing composition of claim 1, wherein the first and second amine compounds each independently comprise a secondary amine compound, a tertiary amine compound, or a combination thereof.

3. The near-infrared absorbing composition of claim 2, wherein the first and second amine compounds each independently comprise an aliphatic secondary amine compound, an aliphatic tertiary amine compound, or a combination thereof.

4. The near-infrared absorbing composition of claim 1, wherein the polymerizable functional group comprises an alkenyl group, an alkynyl group, a acrylate group, an epoxy group, or a combination thereof.

5. The near-infrared absorbing composition of claim 1, wherein a combination of the first amine compound and the second amine compound is included in an amount greater than 0 wt % and less than or equal to 20 wt % based on a solid content of the near-infrared absorbing composition.

6. The near-infrared absorbing composition of claim 1, wherein a combination of the first amine compound and the second amine compound has a boiling point of greater than or equal to about 90° C.

7. The near-infrared absorbing composition of claim 1, wherein the first amine compound is represented by Chemical Formula 1:

$$N(R^{1-})(R^2)(R^3)$$  [Chemical Formula 1]

wherein, $R^1$, $R^2$, and $R^3$ are each independently a C1 to C20 alkyl group, a C4 to C20 cycloalkyl group, $-(CH_2)_j-R^a$, wherein, $R^a$ is a C1 to C10 heteroalkyl group, a C4 to C20 cycloalkyl group, or a C4 to C20 heterocycloalkyl group, and j is an integer of 1 to 10, or a combination thereof.

8. The near-infrared absorbing composition of claim 7, wherein $R^1$, $R^2$, and $R^3$ are each independently a C1 to C20 linear alkyl group, a C3 to C20 branched alkyl group, or a C4 to C20 cycloalkyl group, and when one or more of $R^1$, $R^2$, and $R^3$ is a C1 to C2 alkyl group, at least one of the remaining $R^1$, $R^2$, and $R^3$ is a C3 to C20 linear alkyl group, a C3 to C20 branched alkyl group, or a C4 to C20 cycloalkyl group.

9. The near-infrared absorbing composition of claim 7, wherein the first amine compound comprises a compounds represented by Chemical Formula 1-1, a compound represented by Chemical Formula 1-2, a compound represented by Chemical Formula 1-3, a compound represented by Chemical Formula 1-4, or a combination thereof:

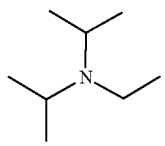

[Chemical Formula 1-1]

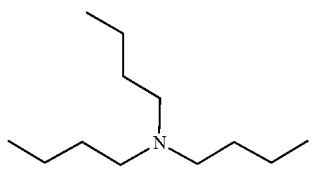

[Chemical Formula 1-2]

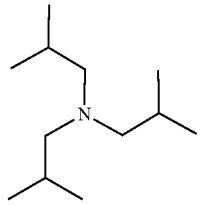

[Chemical Formula 1-3]

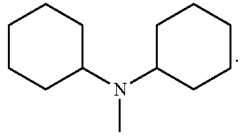

[Chemical Formula 1-4]

10. The near-infrared absorbing composition of claim 1, wherein the second amine compound is represented by Chemical Formula 2:

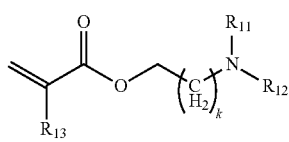

[Chemical Formula 2]

wherein in Chemical Formula 2, $R_{11}$ and $R_{12}$ are independently a C1 to C20 alkyl group, a C2 to C20 alkenyl group, a C2 to C20 alkynyl group, or a C4 to C20 cycloalkyl group, $R_{13}$ is hydrogen, a C1 to C20 alkyl group, a C2 to C20 alkenyl group, a C2 to C20 alkynyl group, or a C4 to C20 cycloalkyl group, and k is an integer of 0 to 8.

11. The near-infrared absorbing composition of claim 10, wherein the first and second amine compounds each independently form a coordination with the copper salt.

12. The near-infrared absorbing composition of claim 11, wherein the first and second amine compounds and the copper salt form a copper complex represented by Chemical Formula 4:

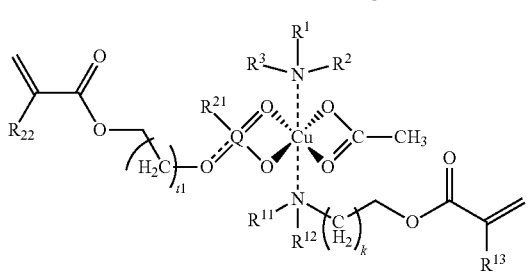

[Chemical Formula 4]

wherein in Chemical Formula 4,

Q is phosphorous or sulfur, $R^1$, $R^2$, and $R^3$ are independently a C1 to C20 alkyl group, a C4 to C20 cycloalkyl group, —$(CH_2)_j$—$R^a$, wherein, $R^a$ is a C1 to 010 heteroalkyl group, a C4 to C20 cycloalkyl group, or a C4 to C20 heterocycloalkyl group, and j is an integer of 1 to 10, or a combination thereof;

$R^{11}$ and $R^{12}$ are independently a C1 to C20 alkyl group, a C2 to C20 alkenyl group, a C2 to C20 alkynyl group, or a C4 to C20 cycloalkyl group, $R^{13}$ is hydrogen, a C1 to C20 alkyl group, a C2 to C20 alkenyl group, a C2 to C20 alkynyl group, or a C4 to C20 cycloalkyl group, t1 is an integer of 0 to 8, k is an integer of 0 to 8, and $R^{21}$ and $R^{22}$ are each independently hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, —$OR^{b1}$, —$O(=O)R^{b2}$, —$OC(=O)R^{b3}$, wherein $R^{b1}$, $R^{b2}$, and $R^{b3}$ are each independently hydrogen, a substituted or unsubstituted C1 to C20 alkyl group, a substituted or unsubstituted C12 to C20 alkenyl group, a substituted or unsubstituted C6 to C20 aryl group, or a substituted or unsubstituted C3 to C20 heteroaryl group, or a functional group represented with Chemical Formula X:

[Chemical Formula X]

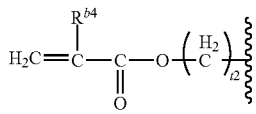

wherein in Chemical Formula X, $R^{b4}$ is hydrogen, a substituted or unsubstituted C1 to C20 alkyl group, a substituted or unsubstituted C1 to C20 heteroalkyl group, a substituted or unsubstituted C6 to C20 aryl group, or a substituted or unsubstituted C3 to C20 heteroaryl group, and t2 is an integer of 0 to 8.

13. The near-infrared absorbing composition of claim 1, which further comprises a polymerizable cross-linking monomer comprising an acryl-based cross-linking monomer, an epoxy-based cross-linking monomer, or a combination thereof.

14. The near-infrared absorbing composition of claim 13, wherein the polymerizable cross-linking monomer comprises an acryl-based cross-linking monomer and an acryl-based cross-linking monomer, and a content of the acryl-based cross-linking monomer is greater than a content of the acryl-based cross-linking monomer based on a total weight of the polymerizable cross-linking monomer.

15. The near-infrared absorbing composition of claim 1, wherein the near-infrared absorbing composition further comprises a polymerizable cross-linking monomer comprising an acryl-based cross-linking monomer, an epoxy-based cross-linking monomer, or a combination thereof.

16. The near-infrared absorbing composition of claim 1, wherein the near-infrared absorbing composition has a maximum absorption wavelength in a wavelength region of about 820 nm to about 900 nm.

17. An optical structure comprising a near-infrared absorption layer formed using the near-infrared absorbing composition of claim 1.

18. The optical structure of claim 17, wherein the copper salt is included in an amount of about 50 wt % to about 70 wt % based on a total weight of the near-infrared absorption layer.

19. The optical structure of claim 17, wherein the optical structure further comprises a transparent substrate in contact with the near-infrared absorption layer.

20. The optical structure of claim 17, wherein the optical structure after being placed at a temperature of 80° C. under relative humidity of 85 RH % for 24 hours exhibits a change of an average light transmittance of less than or equal to about −5% in a wavelength region of about 430 nm to about 565 nm.

21. The optical structure of claim 17, wherein the optical structure after being placed at a temperature of 80° C. under relative humidity of 85 RH % for 24 hours exhibits a change of an average light transmittance of less than or equal to about 10% in a wavelength region of about 950 nm to about 1200 nm.

22. The optical structure of claim 17, wherein the optical structure after being placed at a temperature of 80° C. under relative humidity of 85 RH % for 24 hours exhibits a change of an average light transmittance of less than or equal to about 8% in a wavelength region of about 950 nm to about 1100 nm.

23. Camera module comprising
a lens;
an image sensor; and
the optical structure of claim 17 disposed between the lens and the image sensor.

24. An electronic device comprising the optical structure of claim 17.

* * * * *